United States Patent [19]
Nonomura et al.

[11] Patent Number: 6,094,234
[45] Date of Patent: Jul. 25, 2000

[54] METHOD OF AND AN APPARATUS FOR DECODING VIDEO DATA

[75] Inventors: Itaru Nonomura, Tokyo; Takeo Tomokane, Yokohama; Nobukazu Kondo, Ebina; Kazuaki Tanaka, Yokohama, all of Japan

[73] Assignee: Hitachi, Ltd., Tokyo, Japan

[21] Appl. No.: 08/864,913

[22] Filed: May 29, 1997

[30] Foreign Application Priority Data

May 30, 1996 [JP] Japan ................................. 8-136185

[51] Int. Cl.[7] .......................... H04N 5/14; H04N 9/64
[52] U.S. Cl. .................................................. 348/700
[58] Field of Search ............................ 348/700, 699, 348/400–402, 409–413, 415–416; 345/328; 382/232, 236, 305

[56] References Cited

U.S. PATENT DOCUMENTS

| | | | |
|---|---|---|---|
| 5,267,334 | 11/1993 | Normille et al. .................. 382/236 |
| 5,459,517 | 10/1995 | Kunitake et al. .................. 348/416 |
| 5,614,960 | 3/1997 | Chiba et al. ..................... 348/700 |
| 5,642,294 | 6/1997 | Taniguchi et al. ................ 348/700 |
| 5,757,968 | 5/1998 | Ando ............................. 382/236 |
| 5,760,847 | 6/1998 | Enokida .......................... 348/700 |
| 5,815,217 | 9/1998 | Kumazawa et al. ................. 348/700 |
| 5,844,607 | 12/1998 | Gebler et al. ................... 348/700 |
| 5,912,709 | 6/1999 | Takahashi ........................ 348/416 |

*Primary Examiner*—Vu Le
*Attorney, Agent, or Firm*—Antonelli, Terry, Stout & Kraus, LLP

[57] ABSTRACT

An information processing apparatus for processing video data and video data with audio data includes a scene change detecting device for particularly detecting a scene change of video data. The video data scene change detecting device includes an intra-coded frame detecting device for detecting a scene change between an intra-coded frame contained in video data and an intra-coded frame preceding the frame and a scene change information recording device for recording scene change information detected by the intra-coded frame detecting device.

34 Claims, 21 Drawing Sheets

SCENE 1

FRAME 1

FRAME 2

SCENE 2

FRAME 3

SCENE CHANGE FRAME

| START ADDRESS (BYTES) | DECODING START TIME (s) |
|---|---|
| 305,452 | 15 |
| 555,238 | 36 |
| 1,036,656 | 52 |

| PICTURE No. | AMOUNT OF DATA (BYTES) (A) | AVERAGE AMOUNT OF DATA OF THREE PRECEDING FRAMES (BYTES) (B) | A/B | SCENE CHANGE PRESENT/ ABSENT |
|---|---|---|---|---|
| 1 | 5204 | - | - | - |
| 2 | 4888 | - | - | - |
| 3 | 3844 | - | - | - |
| 4 | 5550 | 4631 | 1.20 | ABSENT |
| 5 | 9852 | 4760 | 2.07 | PRESENT |
| 6 | 6620 | 6415 | 1.03 | ABSENT |
| 7 | 4832 | 7340 | 0.66 | ABSENT |

| PICTURE No. | AMOUNT OF DATA (BYTES) (A) | AVERAGE AMOUNT OF DATA OF THREE PRECEDING FRAMES (BYTES) (B) | A/B | SCENE CHANGE PRESENT/ ABSENT |
|---|---|---|---|---|
| 1 | 1662 | - | - | - |
| 2 | 1820 | - | - | - |
| 3 | 2200 | - | - | - |
| 4 | 1248 | 1894 | 0.66 | ABSENT |
| 5 | 2200 | 1756 | 1.25 | ABSENT |
| 6 | 1690 | 1883 | 0.90 | ABSENT |
| 7 | 9456 | 1713 | 5.52 | PRESENT |

| START ADDRESS (BYTES) | DECODING START TIME (s) |
|---|---|
| 29,634 | 15 |
| 56,112 | 28 |
| 98,320 | 49 |

| VIDEO START ADDRESS (BYTES) | AUDIO START ADDRESS (BYTES) | DECODING START ADDRESS (s) |
|---|---|---|
| 305,452 | | 15 |
| | 56,112 | 28 |
| 555,238 | | 36 |
| | 98,320 | 49 |
| 1,036,656 | | 52 |

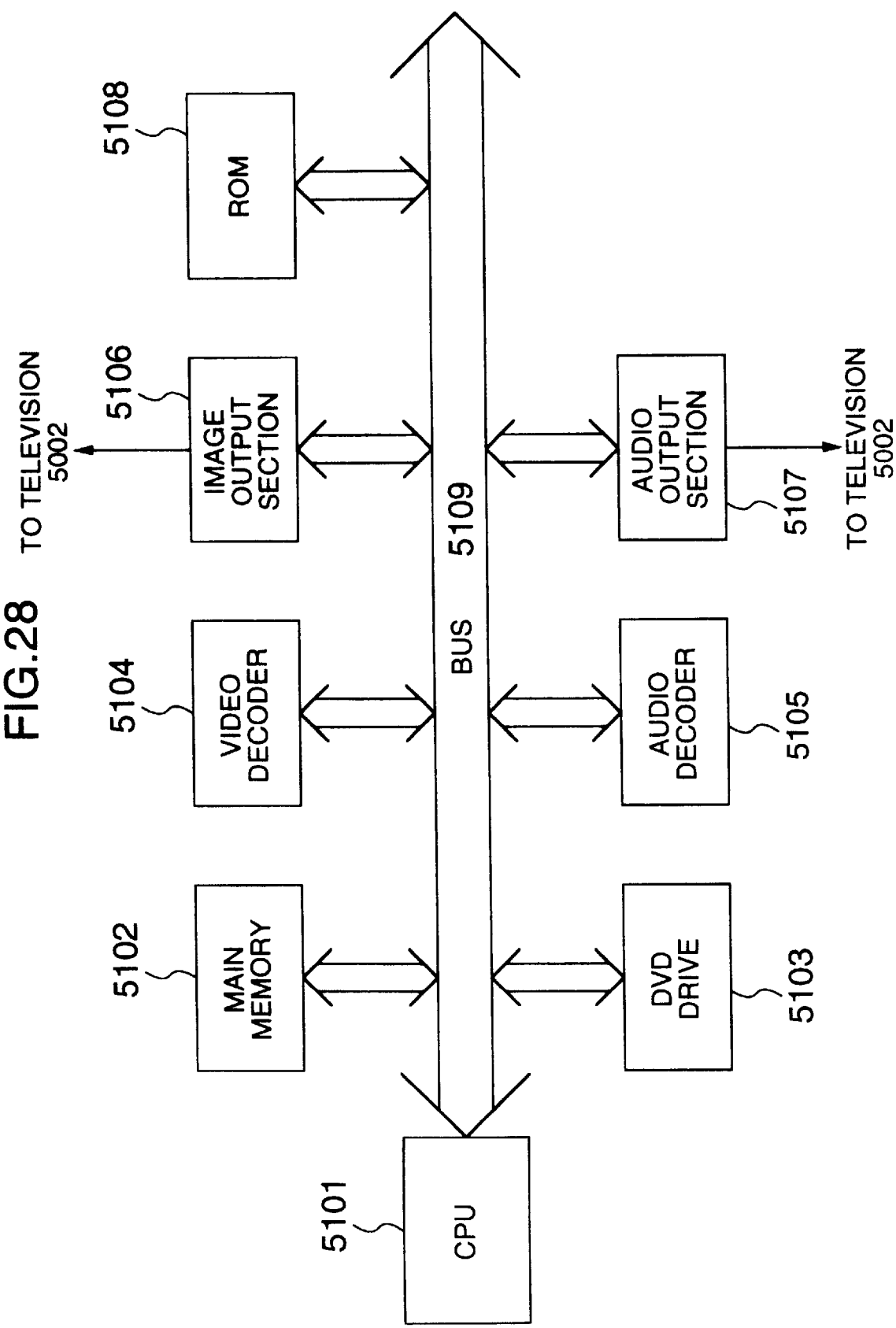

METHOD OF AND AN APPARATUS FOR DECODING VIDEO DATA

BACKGROUND OF THE INVENTION

The present invention relates to a method and an apparatus for decoding video data and video data with audio data.

Recently, with advance of the information processing technology, there has been broadly employed a system in which video and audio are digitized for the recording and reproduction thereof.

It is possible to produce a copy of digital data without deterioration thereof and hence the digital data is suitable for the editing operation. Therefore, there exists a considerable need for an editing system and a search system to process digital video data and digital audio data.

In this operation, to efficiently achieve the editing operation of video and audio, it is essential that data to be recorded can be retrieved at a high speed.

Attention has been consequently attracted to a non-linear editing system using such random-access media for accumulating therein digital data as a magnetic disk, a magneto-optical disk, and an optical disk.

In general, however, the random-access media described above is limited in the capacity thereof.

On the other hand, the digital video data and digital audio data is large in volume. Particularly, the data volume of video data is quite large.

For example, to accumulate digital video data for one hour under a condition that the video data has a speed of 30 frames per second, each frame includes 352 pixels by 240 pixels, and each pixel includes 24 bits, there is required a storage capacity of about 24 gigabytes.

In the non-linear editing system, consequently, the data volume of video is generally reduced using a data compression technology.

For the video data compression in a commercial non-linear editing system, Motion Joint Photographic Experts Group (JPEG) method has been broadly adopted worldwide at present.

The Motion JPEG method is a method of compressing video data using a JPEG method originally developed to compress still video data, and consideration has not been given to audio data. Consequently, the format of video data with audio data varies between editing systems, leading to a problem of compatibility of data.

On the other hand, the MPEG method is an international standard including a method of compression and decompression of video and audio as well as a method of synchronous reproduction of video and audio. Therefore, data conforming to the MPEG method has high data compatibility.

In consequence, when a data is communicated between general users, it is convenient to adopt an editing system utilizing the MPEG method.

Details of the MPEG method has been described in ISO/IEC Standard No. 11172-1 MPEG1 Video, ISO/IEC Standard No. 11172-3, ISO/IEC Standard No. 13818-1 MPEG Video, and ISO/IEC Standard No. 13818-3.

In an operation to edit video and/or video with audio data in which desired scenes are kept retained and undesired scenes are deleted, it is a general practice that the contents of video and/or video with audio data are first confirmed to select the scenes, which however requires quite a large volume of labor.

In this situation, it can be considered that the system for editing video and/or the system for editing video with audio data are/is provided with a function to automatically detect a scene change such that the operation to select/delete scenes is facilitated so as to minimize the volume of labor in the editing operation.

To detect the scene change in the video data compressed in the MPEG method or the like, it will be possible to adopt a method in which the compressed video data is first decoded to attain image data and then a scene change detection processing is accomplished for the image data.

However, the method requires two processings including a decode processing and a scene change detect processing and hence the processing load is heavy and/or overhead is increased.

Consequently, a high processing performance is required for the video editing system in this method, which arises a problem of a high cost due to the high processing performance of the video editing system.

To solve the problem above, the JP-A-6-133305 discloses a technology in which the scene change is detected in accordance with the data volume of each frame of the compressed video data without decoding the compressed video data.

The MPEG method described above includes three kinds of coding methods and the data volume of each frame varies depending on the coding methods.

Consequently, when detecting the scene change according to the data volume of each frame, it is necessary to consider the coding method for each frame.

Moreover, it is a general practice in the MPEG method to control the data volume such that data volume is fixed for each unit of time in the coding operation.

That is, the data volumes respectively of the frames related to the same coding method resultantly take values which are similar to each other.

Therefore, in the method described in the JP-A-6-133305, there is a danger of a wrong scene change detection for the video data in the MPEG format.

Additionally, the method described in the publication of JP-A-6-133305 is attended with a problem that consideration has not been given to audio data.

SUMMARY OF THE INVENTION

It is therefore an object of the present invention, which has been devised in consideration of the problem above, to provide a method of and an apparatus for coding video data in which consideration is given to the coding method for each frame of video data to conduct a scene change detection suitable for the coding method so as to efficiently detect a scene change using a minimized volume of processing.

In addition, another object of the present invention is to provide a method of and an apparatus for decoding video data in which when processing video data with audio data capable of detecting a scene change using a minimized volume of processing with high detection capability.

To achieve the object above, a method of detecting a video data scene change according to a first aspect of the present invention, comprises detecting an I-picture produced by coding compressed video data without using a correlation with respect to another frame contained in the data, sequentially generating one frame of image data by decoding data of the detected I-picture and thereby producing respective image data of a plurality of frames, calculating a difference between first image data of an arbitrary first frame thus produced and second image data of a second frame adjacent to the first frame, and determining occurrence of a scene change in the video data when the difference calculated between the image data items exceeds a predetermined threshold value.

A method for detecting a video data scene change according to a second aspect of the present invention comprises detecting a picture header contained in compressed video data, the header including a picture type indicating that a current frame is a P-picture created by coding the data using a correlation with respect to one preceding frame and information indicating a start point of data corresponding to one frame of data; sequentially decoding, when the frame is an I-picture, one frame of data succeeding the detected picture header and thereby producing respective data of a plurality of frames, calculating, when the detected picture type of the current frame is the P-picture, a difference between an amount of data of the P-picture of the current frame and an amount of data of a P-picture of a preceding frame adjacent to the current frame, and determining occurrence of a scene change in the compressed video data when the difference calculated between the amounts of data exceeds a predetermined threshold value.

A scene change detecting method according to a third aspect of the present invention comprises detecting a picture header contained in compressed video data, the header including a picture type indicating that a current frame is an I-picture produced by coding the data without using a correlation with respect to another frame or a P-picture created by coding the data using a correlation with respect to one preceding frame and information indicating a relationship of data corresponding to one frame of image data; sequentially decoding, when the frame is an I-picture, one frame of data succeeding the detected picture header and thereby producing respective image data of a plurality of frames, determining a picture type of the current frame according to the picture type contained in the detected picture header, calculating, when the determined picture type is the I-picture, a difference between data of the I-picture of the current frame and data of an I-picture of a preceding frame adjacent to the current frame, determining occurrence of a scene change in the video data when the difference calculated between the data items exceeds a predetermined threshold value, and determining, when the determined picture type of the current frame is the P-picture on the other hand, occurrence of a scene change in the video data if a difference between an amount of data of the P-picture of the current frame and an amount of data of a P-picture of a preceding frame adjacent to the current frame exceeds a predetermined threshold value.

A scene change detecting method according to a fourth aspect of the present invention comprises detecting a picture header contained in compressed video data, the header including a picture type indicating that a current frame is a B-picture produced by coding the data using correlations with respect to two frames including one frame in the past and one frame in the future and information indicating a start point of data corresponding to one frame of image data and calculating, when the detected picture type of the current frame is the B-picture, a difference between an amount of data of the B-picture of the current frame and an amount of data of a B-picture of a preceding frame adjacent to the current frame and determining occurrence of a scene change in the compressed video data when the difference calculated between the amount of data items exceeds a predetermined threshold value.

A scene change detecting method according to a fifth aspect of the present invention, comprises detecting a picture header contained in compressed video data, the header including a picture type indicating that a current frame is an I-picture produced by coding the data without using a correlation with respect to another frame, a P-picture created by coding the data using a correlation with respect to one preceding frame, or a B-picture generated by coding the data using correlations with respect to two frames including one frame in the past and one frame in the future and information indicating a relationship of data corresponding to one frame of data, sequentially decoding, when the frame is an I-picture, one frame of data succeeding the detected picture header and thereby producing respective image data of a plurality of frames, determining a picture type of the current frame in accordance with the picture type contained in the detected picture header, calculating, when the determined picture type is the I-picture, a difference between image data of the I-picture of the current frame and image data of an I-picture of a preceding frame adjacent to the current frame, determining occurrence of a scene change in the video data when the difference calculated between the image data items exceeds a predetermined threshold value, determining, when the determined picture type of the current frame is the P-picture, occurrence of a scene change in the video data if a difference between an amount of data of the P-picture of the current frame and an amount of data of a P-picture of a r preceding frame adjacent to the current frame exceeds a predetermined threshold value, and calculating, when the determined picture type of the current frame is the B-picture on the other hand, a difference between an amount of data of the B-picture of the current frame and an amount of data of a B-picture of a preceding frame adjacent to the current frame and determining occurrence of a scene change in the video data if the difference calculated between the amounts of data items exceeds a predetermined threshold value.

A scene change detecting method according to a sixth aspect of the present invention comprises separating audio data and video data from video data with audio data, generating pulse code modulation (PCM) data by decoding the separated audio data, classifying the generated PCM data in accordance with decoding time zones, calculating feature for each of the classified decoding time zones, and determining the occurrence of a scene change in the video data with audio data when a difference between the features calculated for the consecutive decoding time zones exceeds a predetermined threshold value.

BRIEF DESCRIPTION OF THE DRAWINGS

Other objects, features and advantages of the present invention will become apparent from reading of the following description of the embodiments of the invention taken in conjunction with the accompanying drawings in which:

FIG. 28 is a diagram showing the hardware configuration of the DVD playback system in the fourth embodiment of the present invention.

DESCRIPTION OF THE PREFERRED EMBODIMENTS

Next, description will be given of an embodiment according to the present invention.

Figure 1:
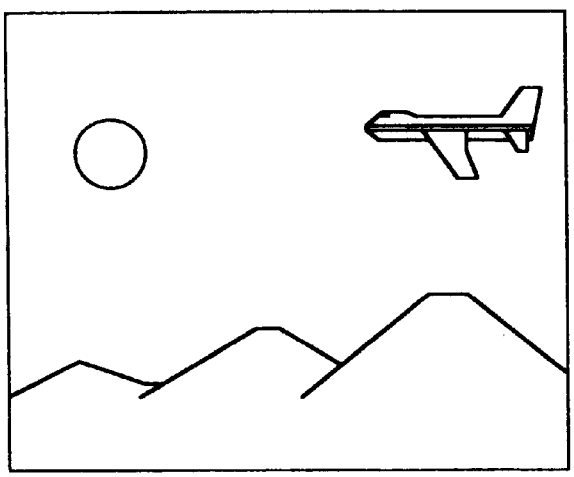
FIG. 1 is a diagram showing the operation of the video scene change.
Figure 1:
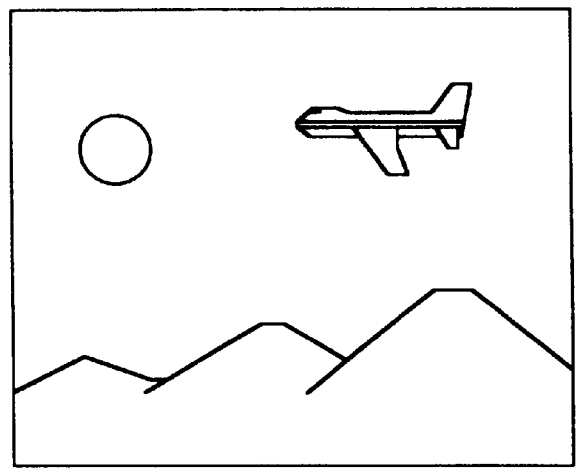
Figure 1:
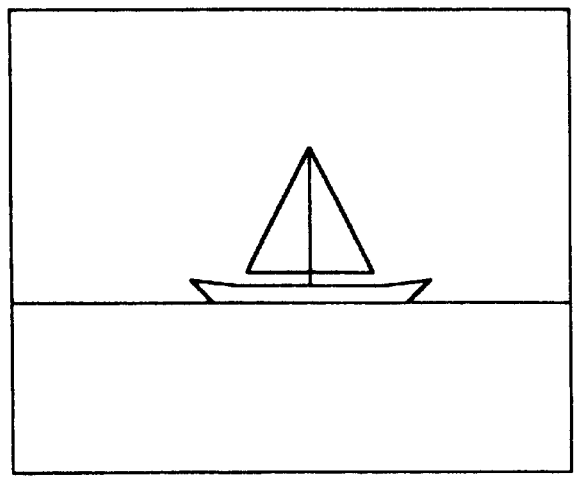

FIG. 1 shows an operation sequence of a scene change.

In FIG. 1, frames 1 to 3 are frames successively displayed with respective to time.

As shown in the diagram, while the contents of images of frames 1 and 2 are similar to each other, those of frames 2 and 3 are completely different from each other. Namely, a scene change has taken place between frames 2 and 3.

An object of the scene change detecting device of the present invention is to detect scene changes of video such as one having occurred between frames 2 and 3 of FIG. 1.

The following description will be given of an example of a case in which each of video data, audio data, and video data with audio data includes data in the MPEG format.

First, the video data of MPEG format will be described by referring to FIGS. 2 to 4.

Figure 2:
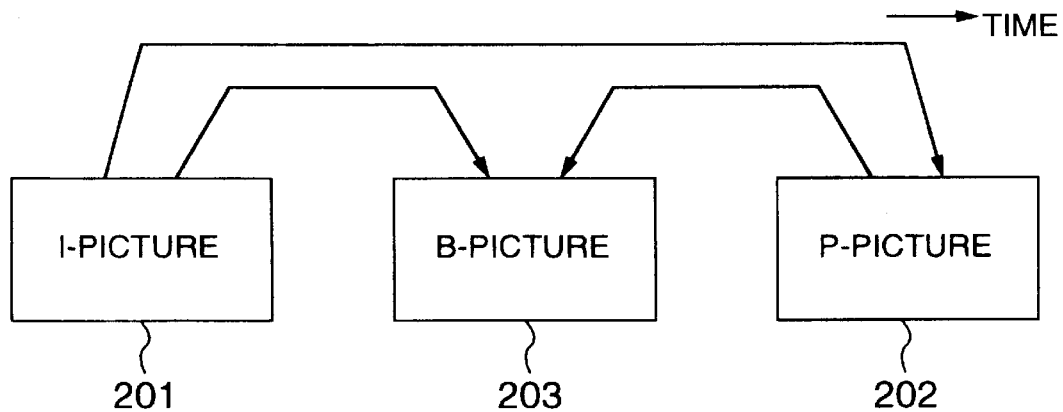
FIG. 2 is a diagram showing the coding operation of three kinds of frames in the MPEG video coding method.

FIG. 2 is a diagram illustrating three frame types contained in the video data of MPEG format.

The I-picture is an intra-coded frame generated by coding data without using a correlation with respect to another frame in the coding operation. The I-picture is generally attended with a small compression ratio and hence the data volume thereof is large.

The P-picture is a predictive-coded frame created by coding data using a correlation with one frame in the past.

That is, in the configuration of FIG. 2, a P-picture 202 is coded using a correlation thereof with an I-picture 201.

Generally, the contents of frames of video successive with respect to time are similar to each other. Therefore, a high correlation exists between two frames which are continuous in time. Since the coding operation is carried out using the correlation, the compression ratio of P-pictures is higher than that of I-pictures, and the data volume per P-picture is less than the data volume per I-picture.

The B-picture is a bidirectionally predictive-coded frame created by coding data using correlations with one frame in the past and one frame in the future.

Since the coding operation is carried out using the correlations with two frames, the compression ratio of B-pictures is also higher than that of P-pictures, and the data volume per B-picture is also less than the data volume per P-picture.

At occurrence of a scene change, the correlation with frames in the past is lowered. In consequence, the compression ratio is reduced in the P-pictures and B-pictures, and the data volume is increased. On the other hand, the correlation between frames is not used for the I-pictures, whether or not the data volume alters at a scene change depends on the contents of the image and cannot be generally determined.

In the MPEG video data, one I-picture is employed for 15 to 30 frames, one P-picture for two to three frames, and one B-picture for two frames or two B-pictures for three frames in many cases.

Figure 3:
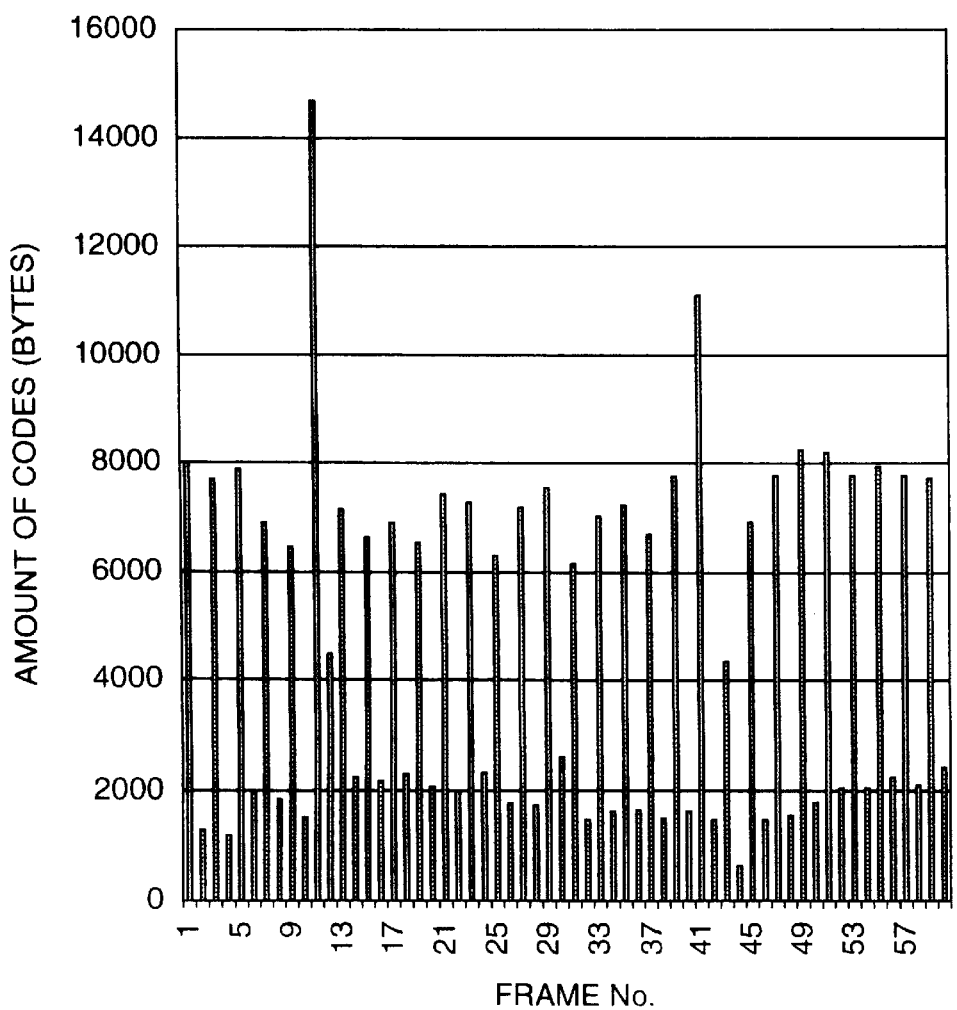
FIG. 3 is a graph showing the data volume of each frame of MPEG video data.

FIG. 3 is a graph showing a typical example of the data volume for each frame of MPEG video data.

In FIG. 3, a frame with a data volume of 10000 bytes or more is related to an I-picture, a frame with a data volume ranging from 3000 to 9999 bytes is associated with a P-picture, a frame with a data volume of 2999 bytes or less is related to a B-picture.

Figure 4:
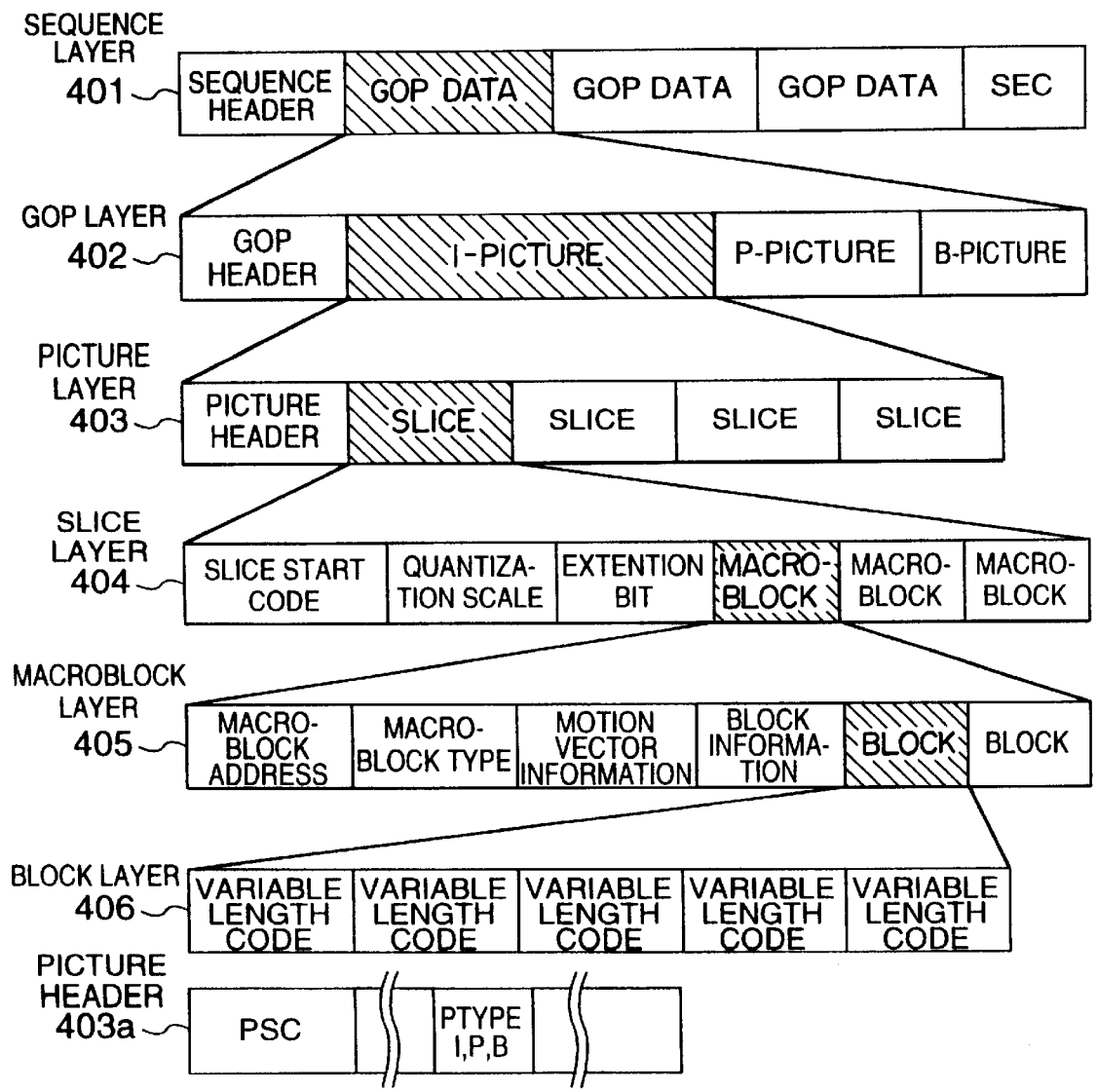
FIG. 4 is a diagram showing the data layout of MPEG video data.

FIG. 4 shows an example of the data layout of video data in the MPEG format.

The MPEG-format video data has a 6-layer construction including a group of picture (GOP) layer, a picture layer, a slice layer, a macroblock layer, and a block layer.

The block layer 406 corresponds to image data including 8 pixels by 8 pixels.

The macroblock layer 405 corresponds to image data including 16 pixels by 16 pixels.

The slice layer 404 includes one or more macroblocks arranged in the horizontal direction on the screen.

The picture layer 403 corresponds to one frame of image and includes a picture header 403a one or more slice layers.

The picture layer 403 begins with a picture start code (PSC) denoting the start of the picture layer and includes a picture type (PTYPE) symbol designating that the picture is an I-picture, a P-picture, or a B-picture. Consequently, the picture type can be determined in accordance with the picture header 403a.

The GOP layer 402 includes a GOP header and one or more picture layers.

The sequence layer 401 includes a sequence header, one or more GOP layers, and a sequence end code (SEC) indicating the end of the sequence.

Figures 23, 24:
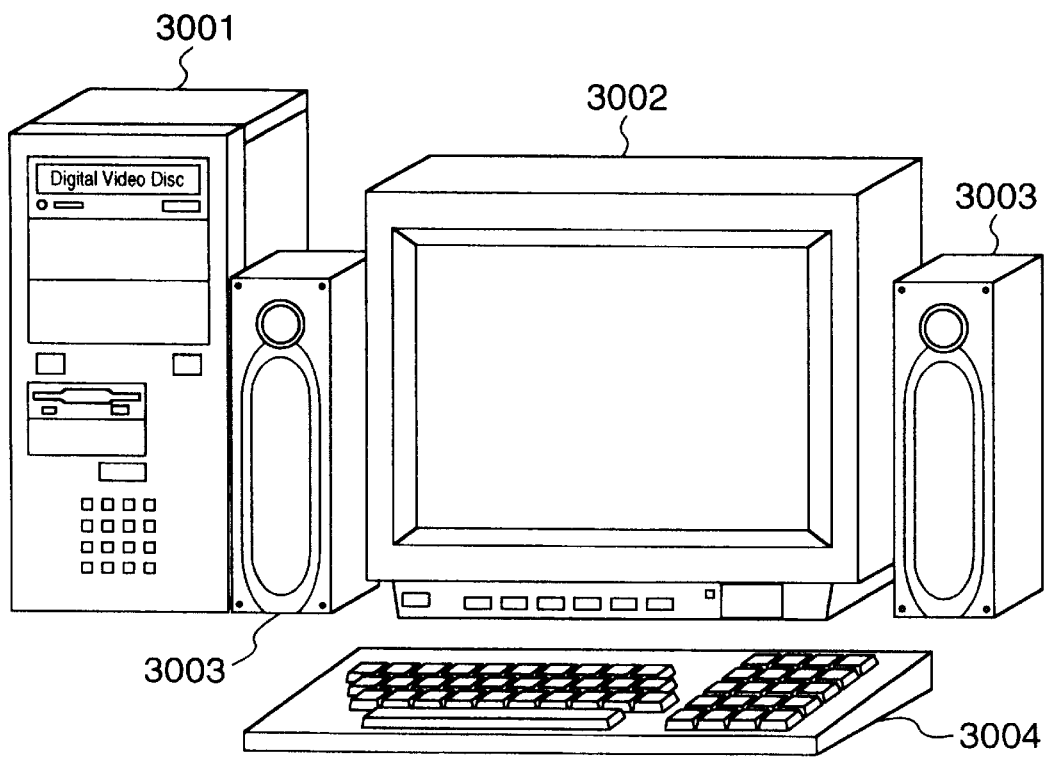
FIG. 23 is a diagram showing an example of the layout of scene change information in the fifth embodiment of the present invention.
FIG. 24 is a perspective view showing an outer appearance of the PC based DVD playback system in the first embodiment of the present invention.

FIG. 24 is a perspective view of a personal computer (PC) based digital video disk (DVD) playback or decoding system to which the first embodiment is applied. The PC based DVD playback system includes a PC system 3001, a display 3002, a loud speaker 3003, and a keyboard 3004.

The display 3002 is a device to display thereon a picture of image signals outputted from the PC system 3001. The speaker 3003 is a device to produce a sound according to an audio signal supplied from the PC system 3001. The keyboard 3004 is a device to receive key inputs from the user of the PC based DVD playback system and to outputs the key inputs to the PC system 3001.

Next, the hardware structure of the PC system 3001 will be described with reference to the drawings.

Figure 5:
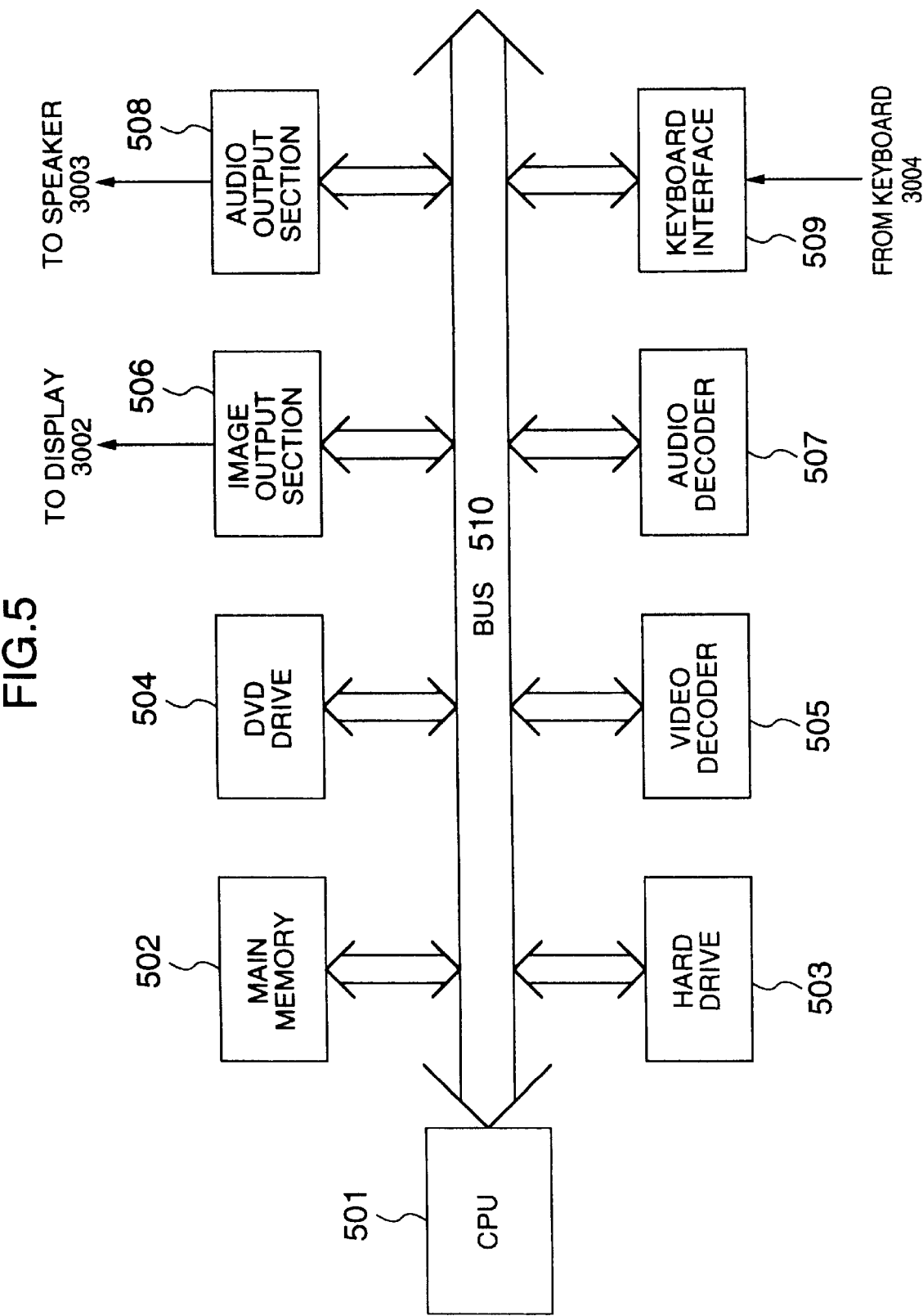
FIG. 5 is a diagram showing the hardware configuration of a personal computer system in the first embodiment of the present invention.

FIG. 5 shows an example of the hardware structure of the PC system 3001.

The PC system 3001 includes a CPU 501, a main memory 502, a hard drive 503, a DVD drive 504, a video decoder 505, an audio decoder 507, an image output section 506, an audio output section 508, a keyboard interface 509, and a bus 510.

In this embodiment, the PC based DVD playback system conducts a video scene change detection processing in which the system detects a scene change contained in video data stored in the DVD drive 504, generates information related to the scene change in the video data, and stores the scene change information in the hard drive 503, the information being used later for playback and editing operations of the video data.

This embodiment is an example in which the video scene change detection processing to be conducted by the video scene change detecting device is implemented by software.

In other words, the video scene change detection processing is achieved such that the CPU 501 loads the software program stored in the hard drive 503 onto the main memory 502 and then executes the software program on the main memory 502.

The main memory 502 is a volatile storage device including storage media such as a semiconductor memory. The hard drive 503 is a nonvolatile storage device including such storage media as a magnetic storage device. The DVD drive 504 is a read only storage device to read digital information recorded on a DVD. The video decoder 505 decodes video data supplied from the CPU 501 to produce image data and then delivers the image data to the image output section 506. The audio decoder 507 decodes audio data fed from the CPU 501 to generate audio data and then supplies the audio data to the audio output section 508. The image output section 506 converts image data supplied from the CPU 501 or the video decoder 505 into an image signal to supply the image signal to the display 3002. The audio output section 508 transforms audio data supplied from the CPU 501 or the audio decoder 507 into an audio signal to output the audio signal to the speaker 3003. The keyboard interface 509 supplies to the CPU 501 a signal fed from the keyboard 3004.

Referring first to FIGS. 6 to 10, description will be given of the processing procedure of the video scene change detection in the first embodiment of the present invention.

Figure 6:
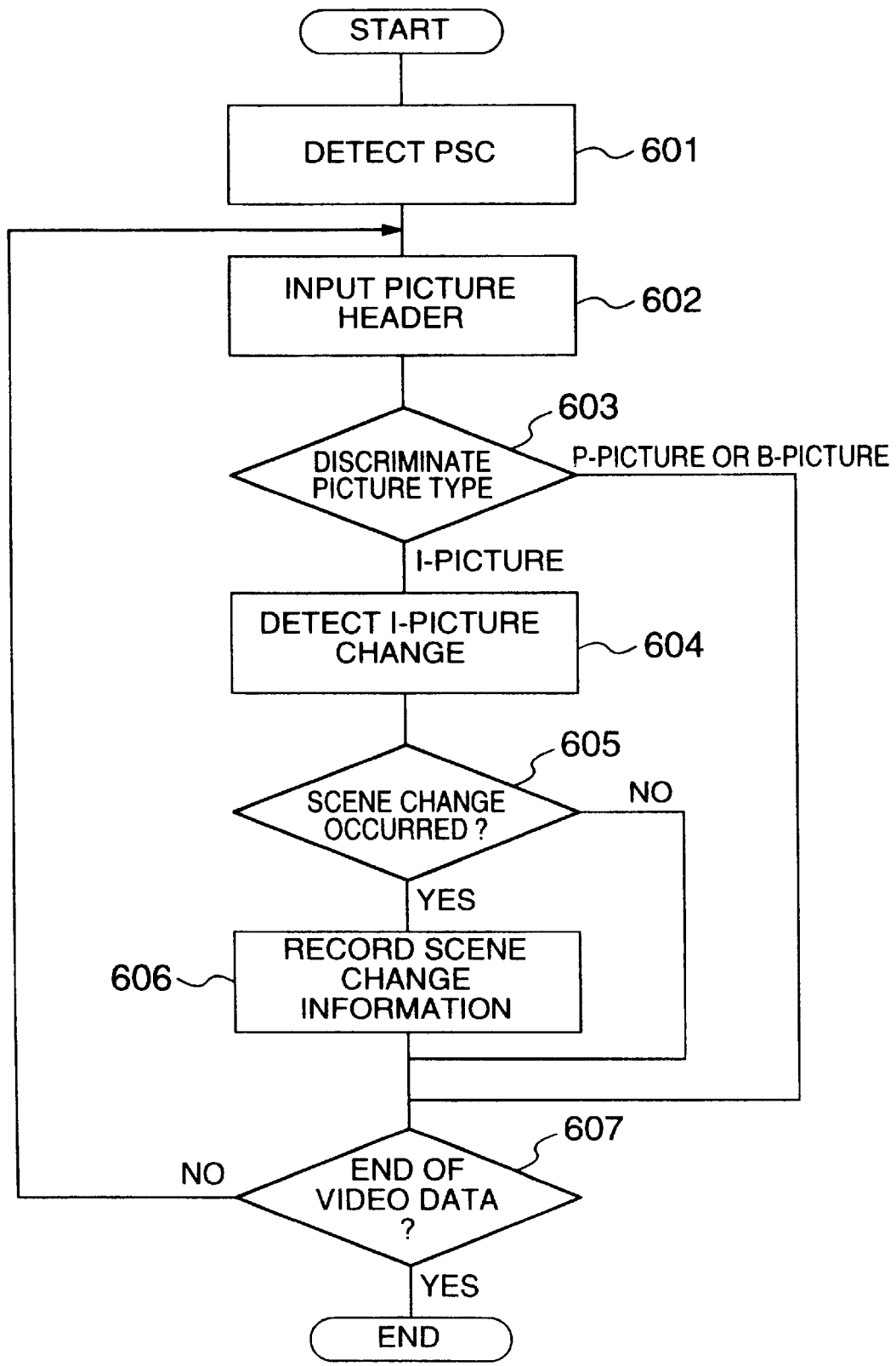
FIG. 6 is a flowchart showing the processing flow of the video scene change detection in the first embodiment of the present invention.

FIG. 6 is a flowchart showing the processing procedure of the video scene change detection in the first embodiment of the present invention.

First, video data is inputted from the DVD drive 504 to detect the first PSC contained in the video data (step 601).

Thereafter, in the video data, there is inputted a picture header including a PSC detected in step 601 or 607 (step 602).

Subsequently, the picture type is discriminated according to the type symbol contained in the picture header. Thereafter, when the current frame is an I-picture, a step 604 is executed; whereas, when the current frame is a P-picture or a B-picture, a step 607 is executed (step 603).

Next, description will be given of the I-picture scene change detection of step 604 by referring to FIGS. 7 to 10.

Figures 7, 10:
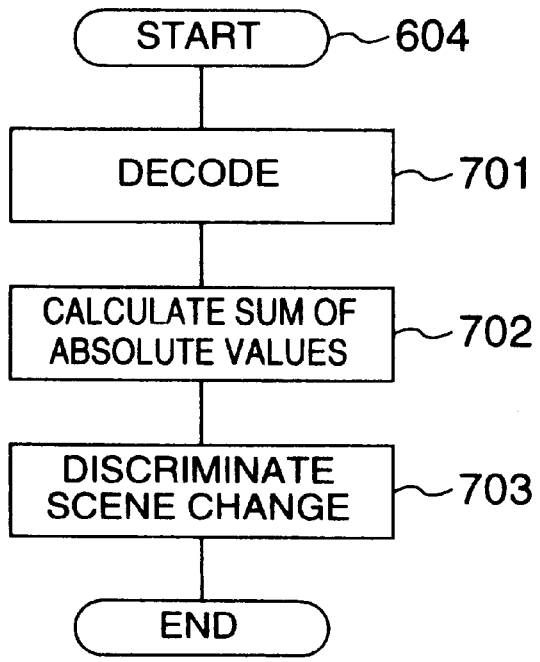
FIG. 7 is a flowchart showing the processing flow of the I-picture scene change detection in the first embodiment of the present invention.
FIG. 10 is a diagram showing an example of the layout of the video scene change information in the first embodiment of the present invention.
Figure 8:
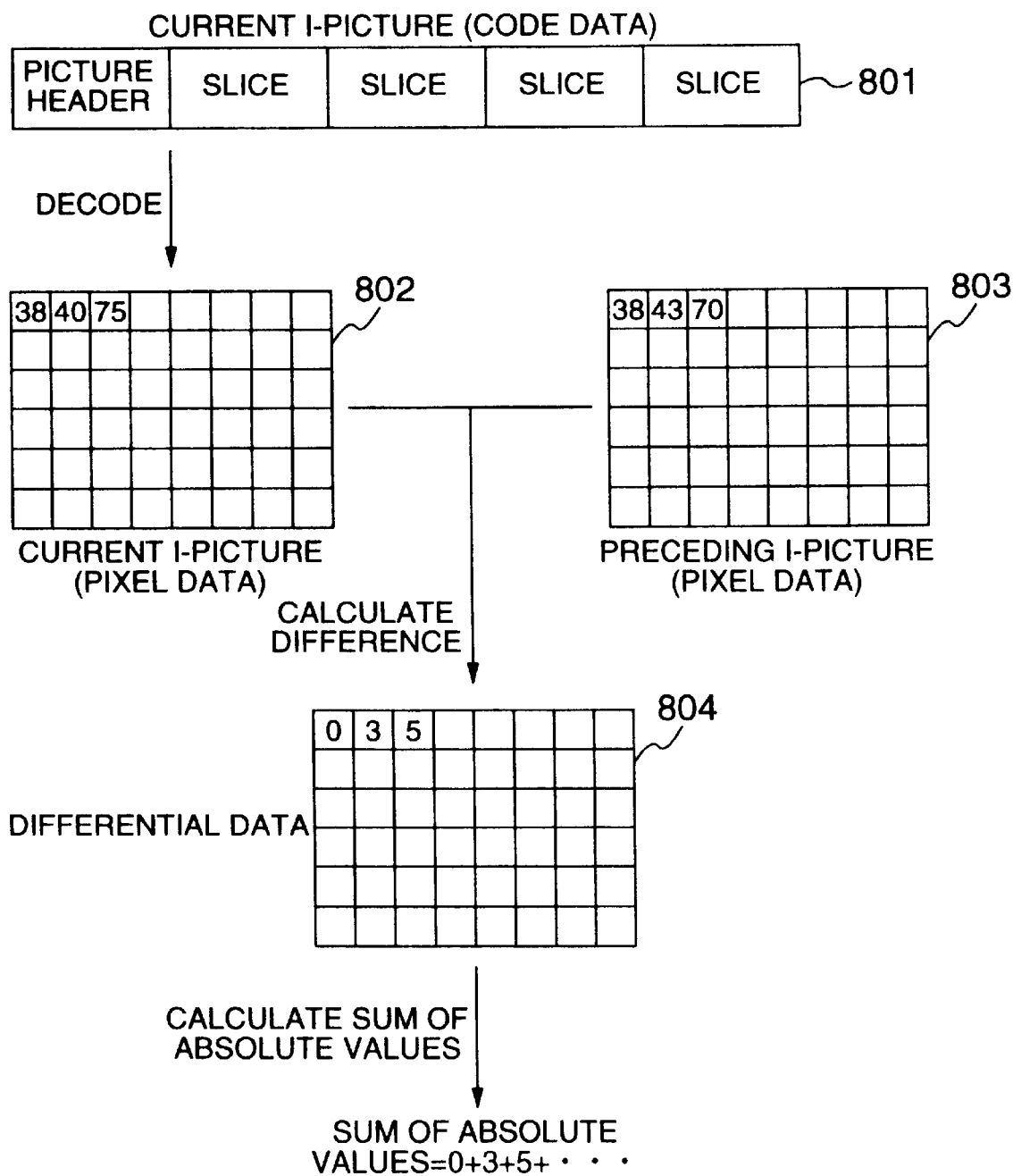
FIG. 8 is a diagram showing the data flow of the I-picture scene change detection in the first embodiment of the present invention.
Figure 9:
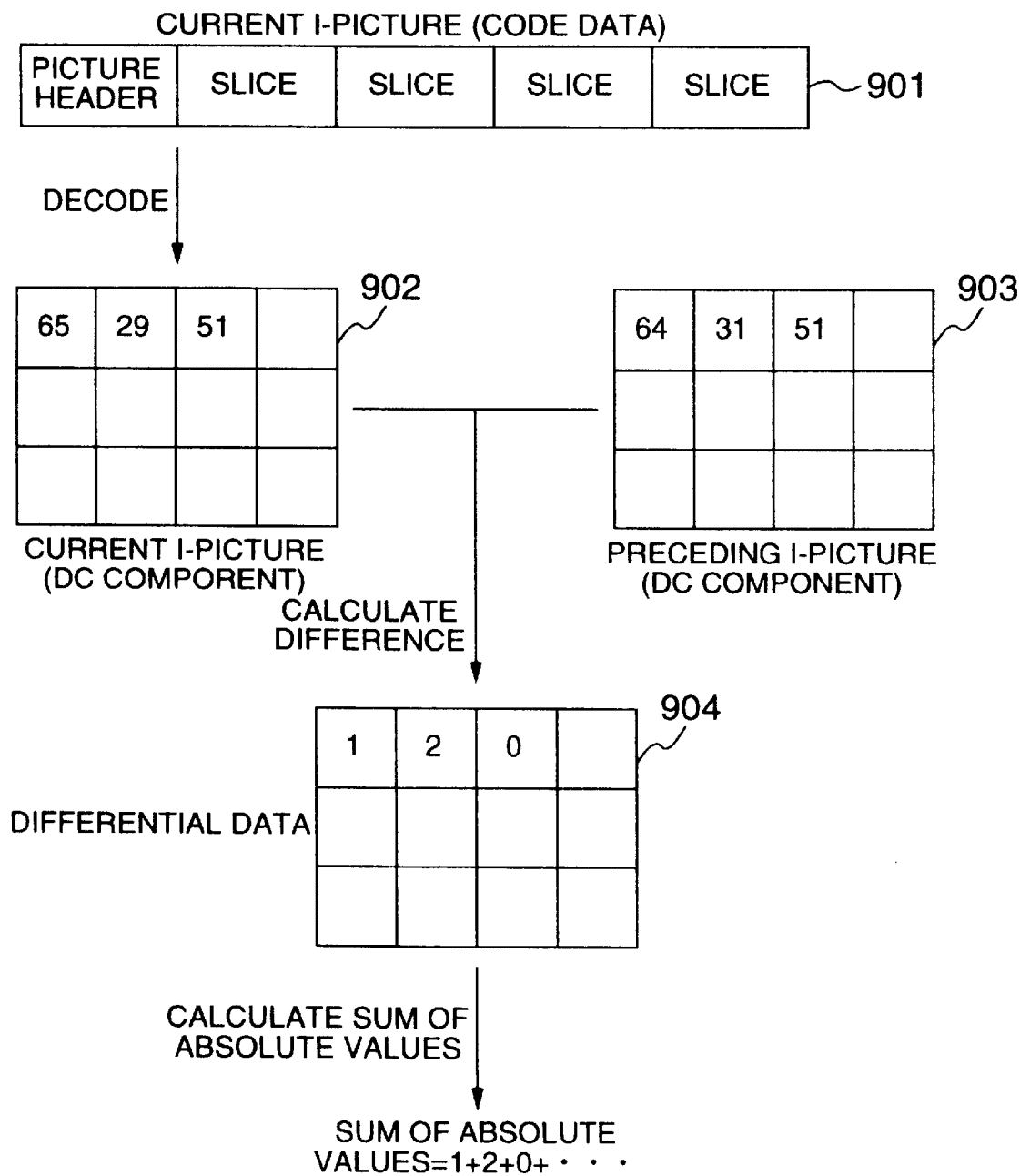
FIG. 9 is a diagram showing the data flow of the I-picture scene change detection in the first embodiment of the present invention.

FIG. 7 shows the processing flow of the I-picture scene change detection, FIG. 8 shows the change of data produced in the processing, and FIG. 9 shows the variation of data taking place due to replacement in step 702.

First, data 801 of the current frame is decoded to generate one frame of image data 802 (step 701).

A difference is then calculated for each pixels between the image data 802 and the image data 803 obtained by decoding the previous I-picture to attain differential data 804. Thereafter, a calculation is conducted to obtain the sum of absolute values of data contained in the differential data 804 (step 702).

In this connection, steps 701 and 702 may be replaced with a processing described below.

First, data 901 of the current frame is decoded to create a DC component 902 of one frame of image data (step 701).

A difference is then calculated for each pixels between the DC component 902 and the DC component 903 obtained by decoding the previous I-picture to attain differential data 904. Thereafter, a calculation is conducted to obtain the sum of absolute values of data contained in the differential data 904 (step 702).

In the MPEG-format video data, the CD component is a mean value of data of the block including 8 pixels by 8 pixels. Although the resolution is decreased when the decoding of video data is limited to the DC component, the processing load is reduced.

Comparing the sum of absolute values and a threshold value beforehand prepared, when the sum of absolute values is larger than the threshold value, occurrence of a scene change is assumed; whereas, when the sum of absolute values is less than or equal to the threshold value, occurrence of a scene change is not assumed (step 703).

Returning to FIG. 6, description will be continuously given of the operation.

Next, when the scene change is detected in step 604, step 606 is executed; whereas, when the scene change is not detected in step 604, step 607 is executed (step 605).

Next, the scene change information recording operation of step 606 will be described by referring to FIG. 10.

FIG. 10 is a diagram showing an example of the configuration of a scene change information table.

The scene change information table includes at least a first address of a frame at which the scene change takes place and a decoding time scene change point.

In the scene change information recording operation of step 606, there is created a scene change information table of FIG. 10 to store the table in the hard drive 503.

In end detection step 607, there is detected the next PSC and SEC in the video data such that when the SEC is first detected, the video scene change detection is terminated; whereas, when the PSC is first detected, step 602 is executed.

According to the first embodiment described above, the I-picture is decoded in the video data of the MPEG format to detect a scene change. Consequently, the scene change can be detected with a low processing load.

Figure 11:
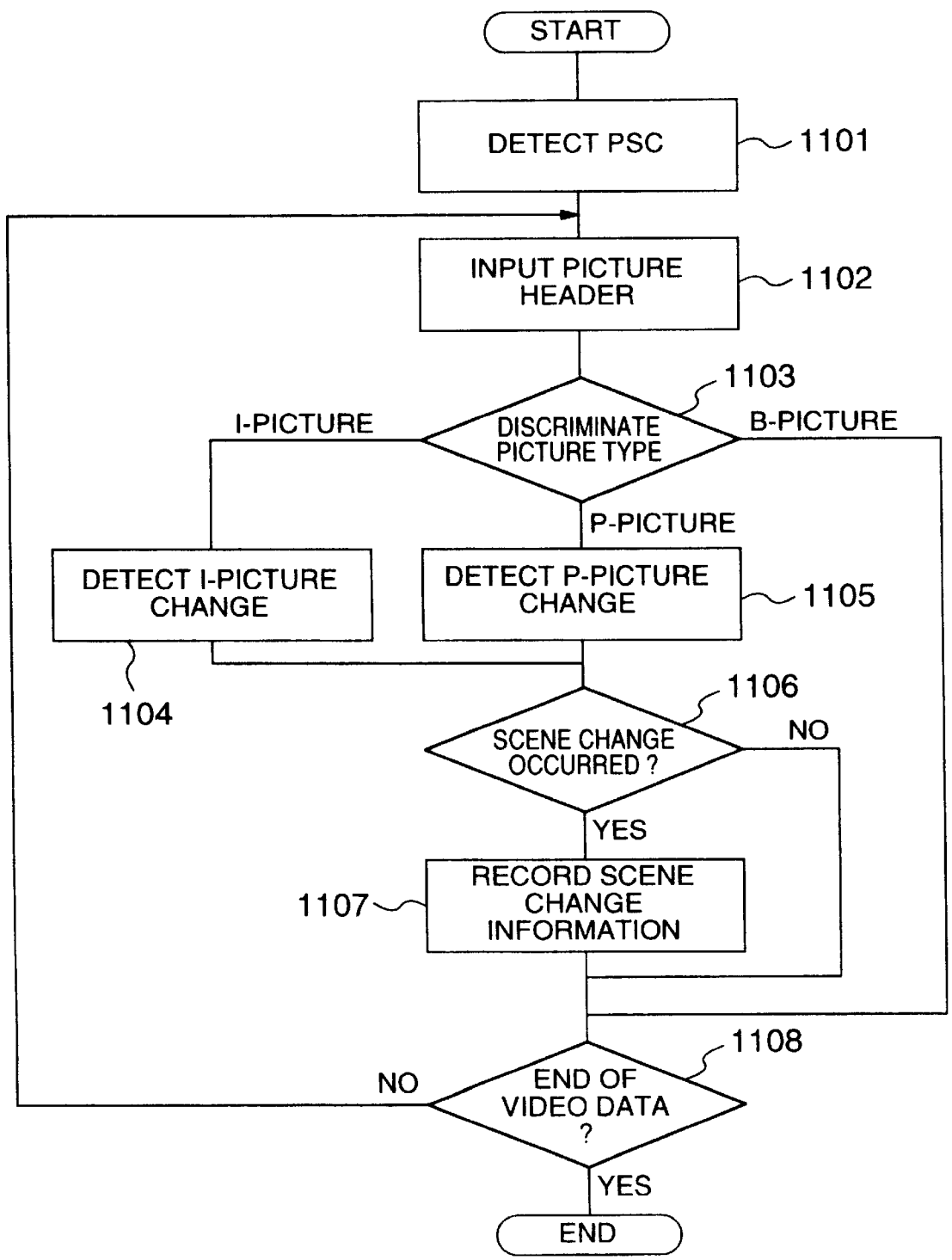
FIG. 11 is a flowchart showing the processing flow of the video scene change detection in the second embodiment of the present invention.
Figures 12, 13:
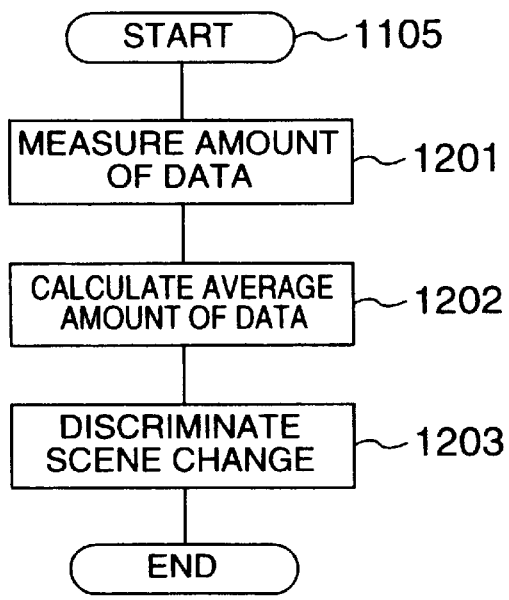
FIG. 12 is a flowchart showing the processing flow of the P-picture scene change detection in the second embodiment of the present invention.
FIG. 13 is an example of auxiliary data utilized to detect a scene change in the second embodiment of the present invention.

Referring next to FIGS. 11 to 13, description will be given of the video scene change detection processing in the second embodiment of the present invention.

The hardware configuration of the scene change detecting device for video data of the second embodiment is the same as that of the video scene change detecting device of the first embodiment (FIG. 5).

In this embodiment, the detecting device conducts a video scene change detection processing such that the device detects a scene change contained in video data stored in the hard drive 503, produces information associated with the scene change of video data, and then stores the scene change information in the hard drive 503.

FIG. 11 is a flowchart showing the processing procedure of the detection.

First, video data is inputted from the hard drive 503 to detect the first PSC contained in the video data (step 1101).

Thereafter, in the video data, there is inputted a picture header including the PSC detected in step 1101 or 1108 (step 1102).

Subsequently, the picture type is discriminated according to PTYPE contained in the picture header. When the current frame is an I-picture, a P-picture, or a B-picture, step 1104, 1105, or 1108 is respectively executed (step 1103).

The detection of I-picture scene change of step 1104 is similar to that of the first embodiment.

Next, the detection of P-picture scene change of step 1105 will be described by referring to FIGS. 12 and 13.

FIG. 12 is a flowchart showing the processing flow of the detection of P-picture scene change.

FIG. 13 is a table employed when the presence or absence of the scene change is determined in accordance with the data volume of each P-picture.

First, the data volume of the current frame is measured such that the measured result is stored in the main memory 502 (step 1201).

Next, a mean value of three preceding frames is obtained according to the data volume of the P-picture stored in the main memory 502 in step 1201 (step 1202).

Additionally, the presence or absence of scene change is determined according to the data volume of the current P-picture measured in step 1201 and the mean value of three preceding frames calculated in step 1202 (step 1203).

In the example of FIG. 13, occurrence of the scene change is determined when the data volume of the current P-picture measured in step 1201 is equal to or more than twice the mean value of three preceding frames calculated in step 1202.

Returning to FIG. 11, description will be further given of the operation.

When the scene change is detected in step 1104 or 1105, step 1107 is executed. When the scene change is not detected in step 1104 or 1105, step 1108 is executed (step 1106).

At detection of the scene change, a scene change information table is created to be accumulated in the hard drive 503 (step 1107).

The information table created in step 1107 is the same as the scene change information table described for the first embodiment.

Returning again to FIG. 11, description will be continued for the operation.

In end detection step 1108, a search is made for the next PSC and SEC in the video data. When SEC is first detected, the scene change detection is terminated; whereas, when PSC is first detected, step 1102 is executed.

According to the second embodiment described above, for the MPEG-format video data, the I-picture is decoded to detect the scene change and the scene change is detected according to the data volume of P-picture. This resultantly enables the scene change to be detected with a low processing load.

Next, description will be given of the third embodiment of the present invention.

Figure 25:
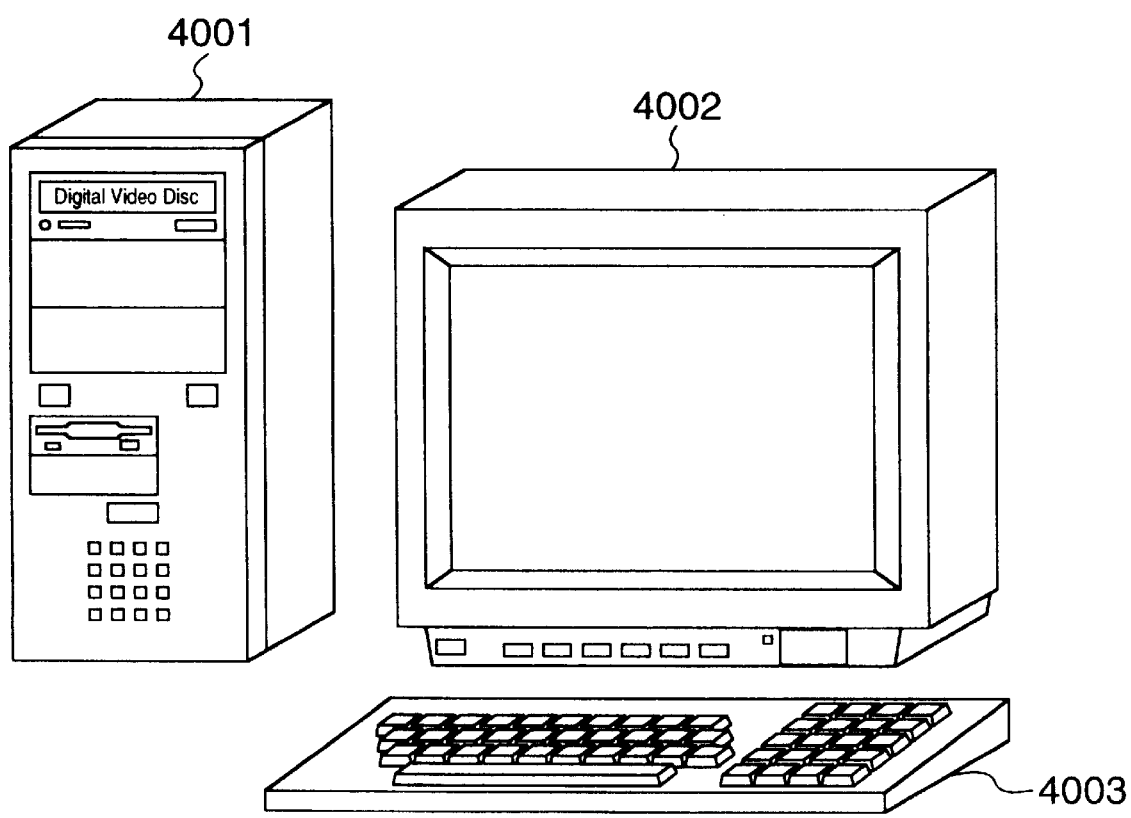
FIG. 25 is a perspective view showing an outer appearance of the MPEG1 coding system in the third embodiment of the present invention.

FIG. 25 is a perspective view of the PC based MPEG1 coding system to which the third embodiment is applied. The coding system includes a personal computer (PC) 4001, a display 4002, and a keyboard 4003.

The display 4002 is a device to display thereon an image according to image signals outputted from the PC 4001.

The keyboard 4003 is a device to receive a key input from the user of the coding system and to output the key input to the PC facility 4001.

Subsequently, the hardware structure of the personal computer 4001 will be described by referring to drawings.

Figure 26:
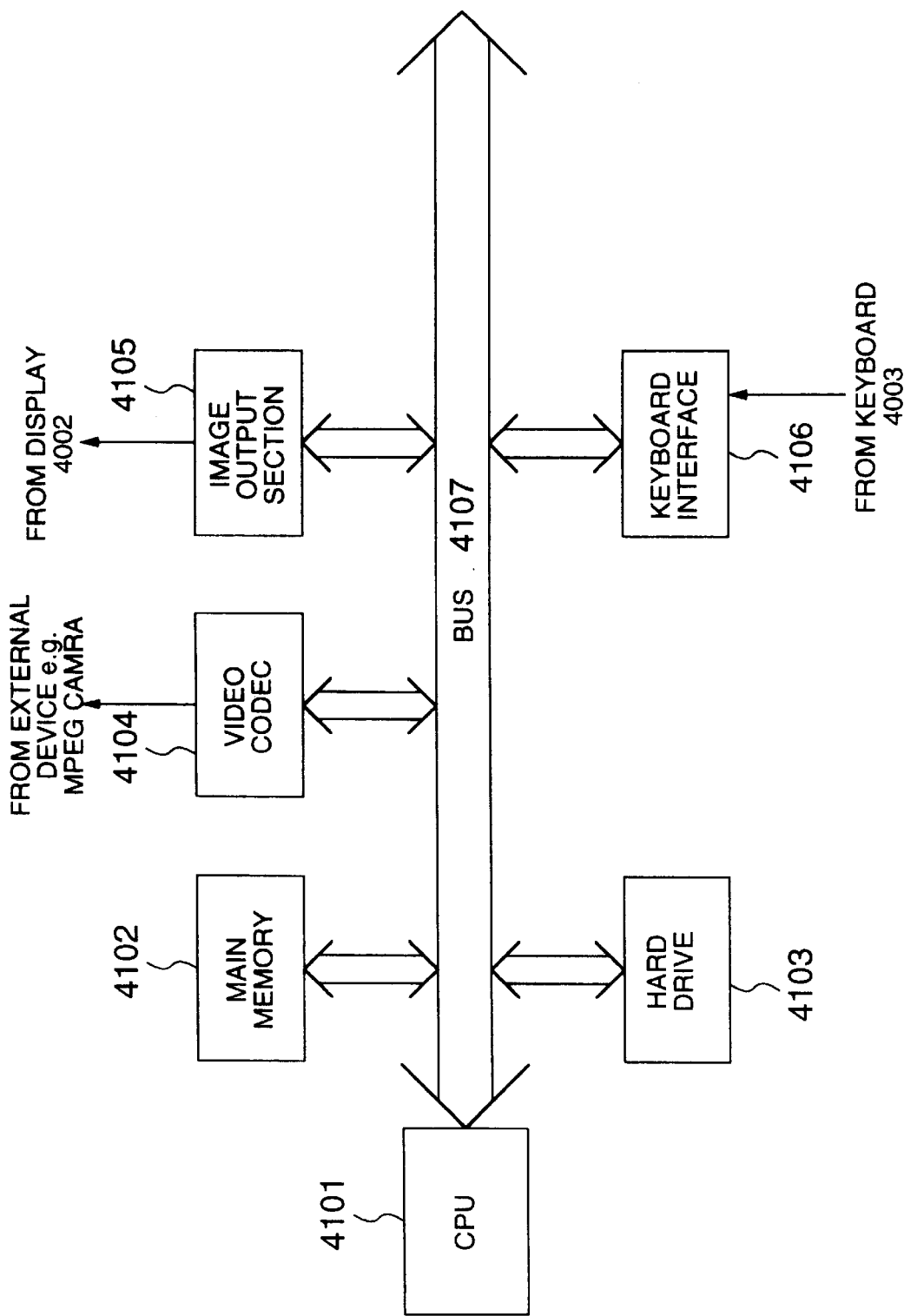
FIG. 26 is a diagram showing the hardware configuration of the personal computer system in the third embodiment of the present invention.

FIG. 26 is a hardware configuration diagram of the personal computer 4001.

The computer 4001 includes a CPU 4101, a main memory 4102, a hard drive 4103, a video CODEC 4104, an image output section 4105, a keyboard interface 4106, and a bus 4107.

In this embodiment, the coding system conducts a ru video scene change detection processing. Namely, the system detects a scene change related to the video data outputted from the video CODEC 4104, generates information associated with the scene change of the video data, and stores the information in the hard drive 4103, thereby terminating the processing.

The embodiment is an example in which the processing of video scene change detection to be conducted by the coding system is implemented by use of software.

In other words, the detection processing is accomplished such that the CPU 4101 loads a software system stored in the hard drive 4103 onto the main memory 4102 and then executes the software system on the memory 4102.

The main memory 4102 is a volatile storage device including a storage media such as a semiconductor memory. The hard drive 4103 is a nonvolatile storage device including a storage media such as a magnetic storage device. The video CODEC 4104 decodes video data supplied from the CPU 4101 to obtain image data and supplies the image data to the image output section 4105. Moreover, the CODEC 4104 codes an image signal supplied from a video camera, a video tape recorder (VTR), or the like externally connected so as to generate video data. The image output section 4105 converts image data supplied from the CPU 4101 or the video decoder 505 into an image signal and outputs the image signal to the display 4102. The keyboard interface 4106 supplies to the CPU 4101 a signal delivered from the keyboard 3004.

Next, the video scene change detection processing of the third embodiment of the present invention will be described by referring to FIGS. 14 to 16.

Figure 14:
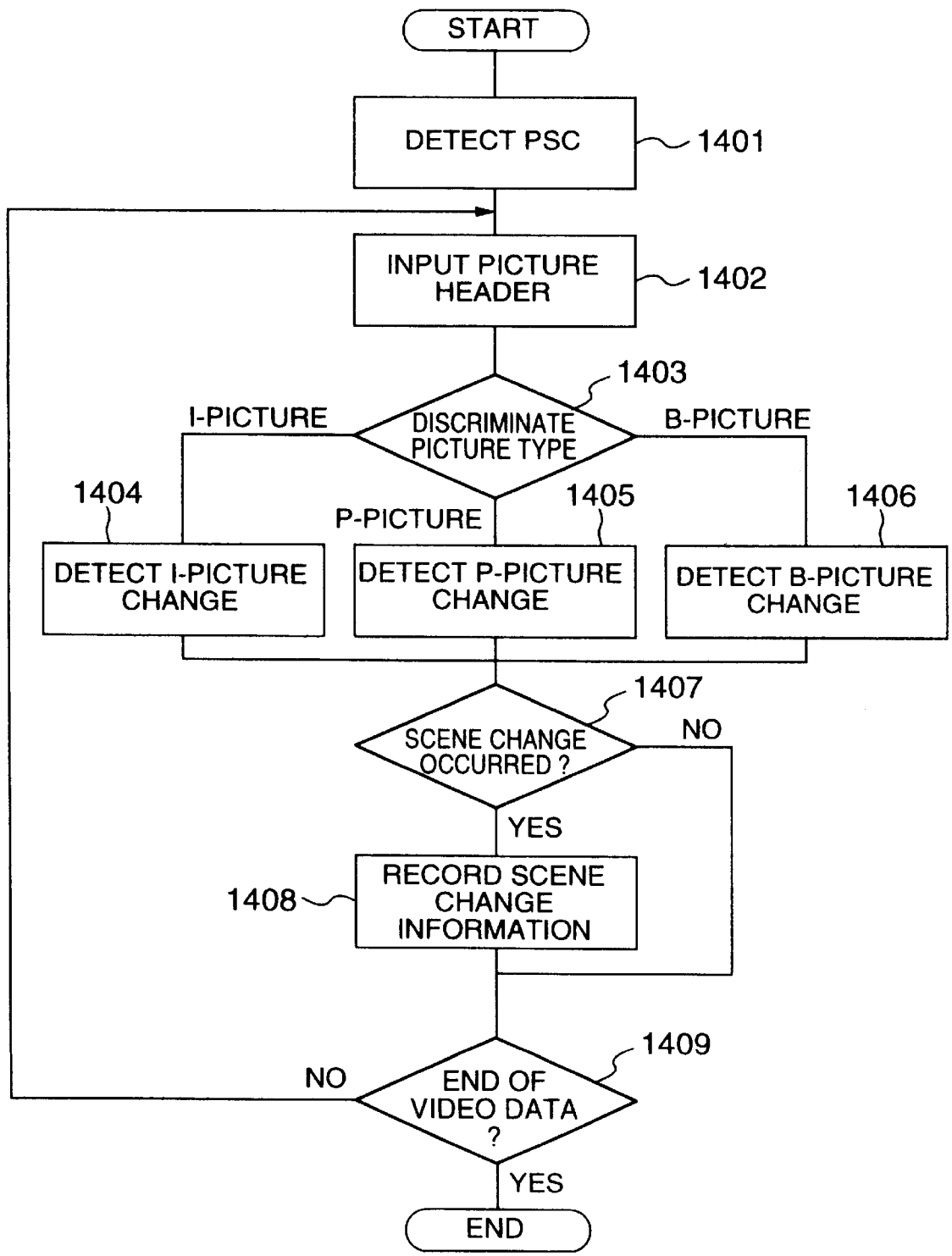
FIG. 14 is a flowchart showing the processing flow of the video scene change detection in the third embodiment of the present invention.

FIG. 14 shows in a flowchart the processing procedure of the detection.

First, video data is inputted from the video CODED 4104 to detect the first PSC contained in the video data (step 1401).

Thereafter, in the video data, there is inputted a picture header including the PSC detected in step 1401 (step 1402).

Subsequently, the picture type is discriminated according to PTYPE contained in the picture header. When the current frame is an I-picture, a P-picture, or a B-picture, step 1404, 1405, or 1406 is respectively executed (step 1403).

The detection of I-picture scene change of step 1404 is similar to that of the first or second embodiment.

The detection of P-picture scene change of step 1405 is almost the same as that of the first embodiment.

Next, the detection of B-picture scene change of step 1406 will be described by referring to FIGS. 15 and 16.

Figures 15, 16:
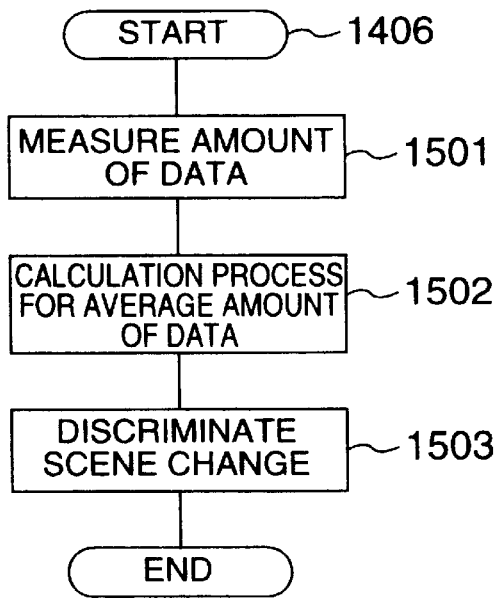
FIG. 15 is a flowchart showing the processing flow of the B-picture scene change detection in the third embodiment of the present invention.
FIG. 16 is an example of auxiliary data utilized to detect a scene change in the third embodiment of the present invention.

FIG. 15 is a flowchart showing the processing flow of the detection of B-picture scene change.

FIG. 16 is a table employed when the presence or absence of the scene change is determined according to the data volume of each B-picture.

First, the data volume of the current frame is measured such that the measured result is stored in the main memory 502 (step 1501).

Next, a mean value of three preceding frames is obtained according to the data volume of the B-picture stored in the past in the main memory 502 in step 1201 (step 1502).

Additionally, the presence or absence of scene change is determined according to the data volume of the current B-picture measured in step 1501 and the mean value of three preceding frames calculated in step 1502.

In the example of FIG. 16, the occurrence of scene change is determined when the data volume of the current B-picture measured in step 1501 is equal to or more than a threshold value, e.g., when the data volume is equal to or more than four times the mean value of three preceding frames calculated in step 1502. However, it is to be appreciated that the optimal threshold value for the data volume of each of the P-picture and B-picture can be set according to, for example, design of experiments (DE).

In this regard, it has been commonly known in the M-PEG technology that the compression ratio of B-pictures is generally higher than that of P-pictures.

Consequently, the ratio of increase in the data volume of the B-picture at presence of occurrence of the scene change compared with that of the B-picture at absence of occurrence of the scene change is generally larger than the ratio of increase in the data volume of the P-picture at presence of occurrence of the scene change compared with that of the P-picture at absence of occurrence of the scene change.

Therefore, when the threshold value adopted for the decision of presence or absence of occurrence of scene change in step 1406 is set to a value larger than the threshold value used for decision of presence or absence of occurrence of scene change in step 1405, it is possible to increase the scene change detection capability.

Returning to FIG. 14, description will be continuously given of the operation.

When the scene change is detected in step 1404, 1405, or 1406, step 1408 is executed; whereas, when the scene change is not detected in step 1404, 1405, or 1406, step 1409 is executed (step 1407).

When the scene change is detected, a scene change information table is created to be accumulated in the hard drive 503 (step 1408).

The information table created in step 1107 is the same as the scene change information table described for the first embodiment.

In end detection step 1409, a search is made for the next PSC and SEC in the video data. When SEC is first detected, the scene change detection is terminated. On the other hand, when PSC is first detected, step 1402 is executed.

According to the third embodiment described above, for the MPEG-format video data, the I-picture is decoded to detect the scene change, the scene change is detected according to the data volume of P-picture not decoded, and the scene change is detected according to the data volume of B-picture not decoded. As a result, the scene change can be detected with a low processing load and there is acquired scene change information. In this regard, each functional step shown in the block of the flowchart of FIG. 14 is implemented as a program to be executed by a computer such as CPU 501 of FIG. 5. The program is stored in a recording media such as a CD-ROM, a floppy disk, and a semiconductor memory accessibly from the computer so as to be operated as a portion of a memory included in the hardware used to embody the present invention. Alternatively, the contents of programs stored in the recording media may also be down-loaded into a hard drive 503. This also applies to the other embodiments.

Next, description will be given of the fourth embodiment of the present invention.

Figure 27:
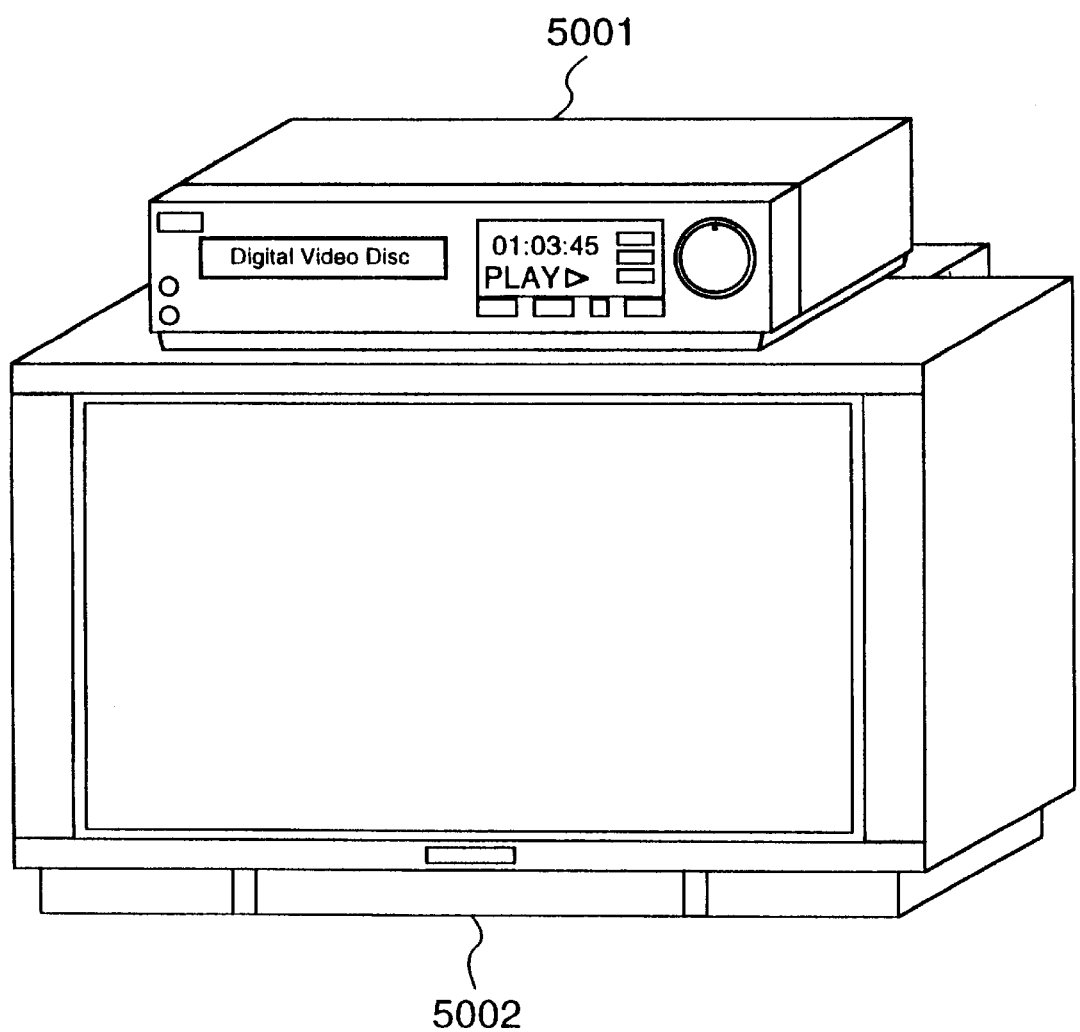
FIG. 27 is a perspective view showing an outer appearance of the DVD playback system in the fourth embodiment of the present invention.

FIG. 27 is a perspective view of a digital video disk (DVD) playback system to which the fourth embodiment is applied. The DVD playback system includes a DVD player 5001 and a television set 5002.

FIG. 28 shows the hardware configuration of the DVD player 5001.

The DVD player 5001 includes a CPU 5101, a main memory 5102, a DVD drive 5103, a video decoder 5104, an audio decoder 5105, an image output section 5106, an audio output section 5107, an ROM 5108, and a bus 5109.

In the embodiment, the DVD player accomplishes a video scene change detection processing. Namely, the player detects a scene change contained in the video data stored in the DVD drive 5103, produces information associated with the scene change of video data, and then stores the scene change information in the main memory 5102.

This embodiment is an example in which the video scene change detection processing to be achieved by the video scene change detecting device is materialized by a software system.

That is, the detection processing is accomplished such that the CPU 5101 loads a software system stored in the ROM 5108 onto the main memory 5102 and then executes the software system on the memory 5102.

The main memory 5102 is a volatile storage device including a storage media such as a semiconductor memory. The DVD drive 5103 is a read only storage device to read digital information recorded on a DVD. The video decoder 5104 decodes video data supplied from the CPU 5101 to obtain image data and supplies the image data to the image output section 5105. The audio decoder 5105 decodes audio data supplied from the CPU 5101 an then feeds the audio data to the audio output section 5107. The image output section 5106 converts image data supplied from the CPU 5101 or the video decoder 5104 into an image signal and outputs the image signal to the television set 5002. The audio output section 5107 converts audio data supplied from the CPU 5101 or the audio decoder 5105 into an audio signal and outputs the audio signal to the television set 5002. The ROM 5108 is a non-volatile storage device including a storage medium such as a semiconductor memory.

In this embodiment, the video scene change detecting device accomplishes a video scene change detection processing such that the device detects a scene change contained in the video data with audio data stored in the DVD drive 5103, produces information associated with the scene change of video data with audio data, and then stores the scene change information in the main memory 5102.

This embodiment is an example in which the video scene change detection processing to be achieved by the video scene change detecting device is implemented by software.

In other words, the detection processing is accomplished such that the CPU 5101 loads software stored in the ROM 5108 onto the main memory 5102 and then executes the software on the memory 5102.

Next, the video scene change detection processing of the fourth embodiment of the present invention will be described by referring to drawings.

Figure 17:
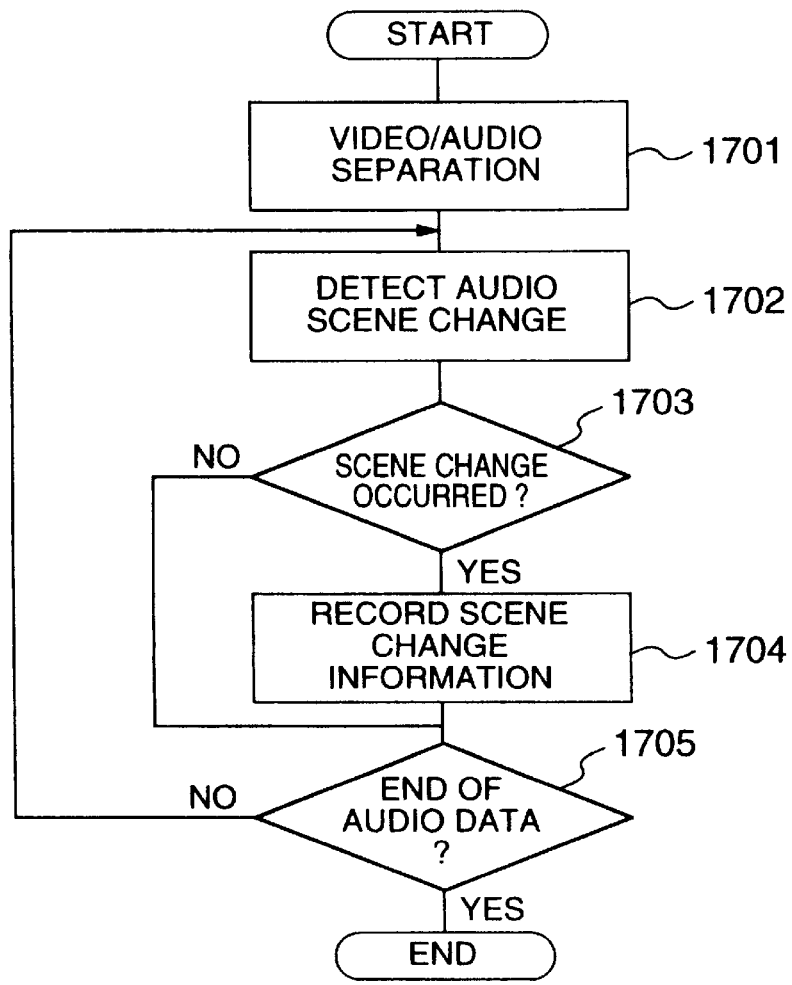
FIG. 17 is a flowchart showing the processing flow of the video scene change detection in the fourth embodiment of the present invention.

FIG. 17 is a flowchart showing the processing procedure of the detection.

First, video data with audio data is inputted from the DVD drive 5103 such that video data and audio data are separated therefrom (step 1701).

Thereafter, the scene change detection is conducted according to the audio data (step 1702).

The scene change detection of step 1702 will be described by referring to FIGS. 18 to 20.

Figure 18:
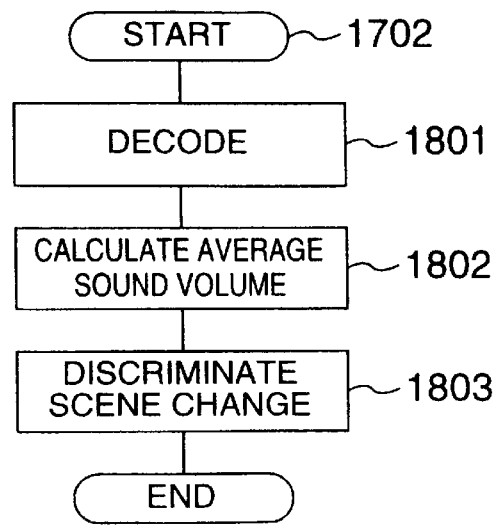
FIG. 18 is a flowchart showing the processing flow of the audio scene change detection in the fourth embodiment of the present invention.
Figure 19:
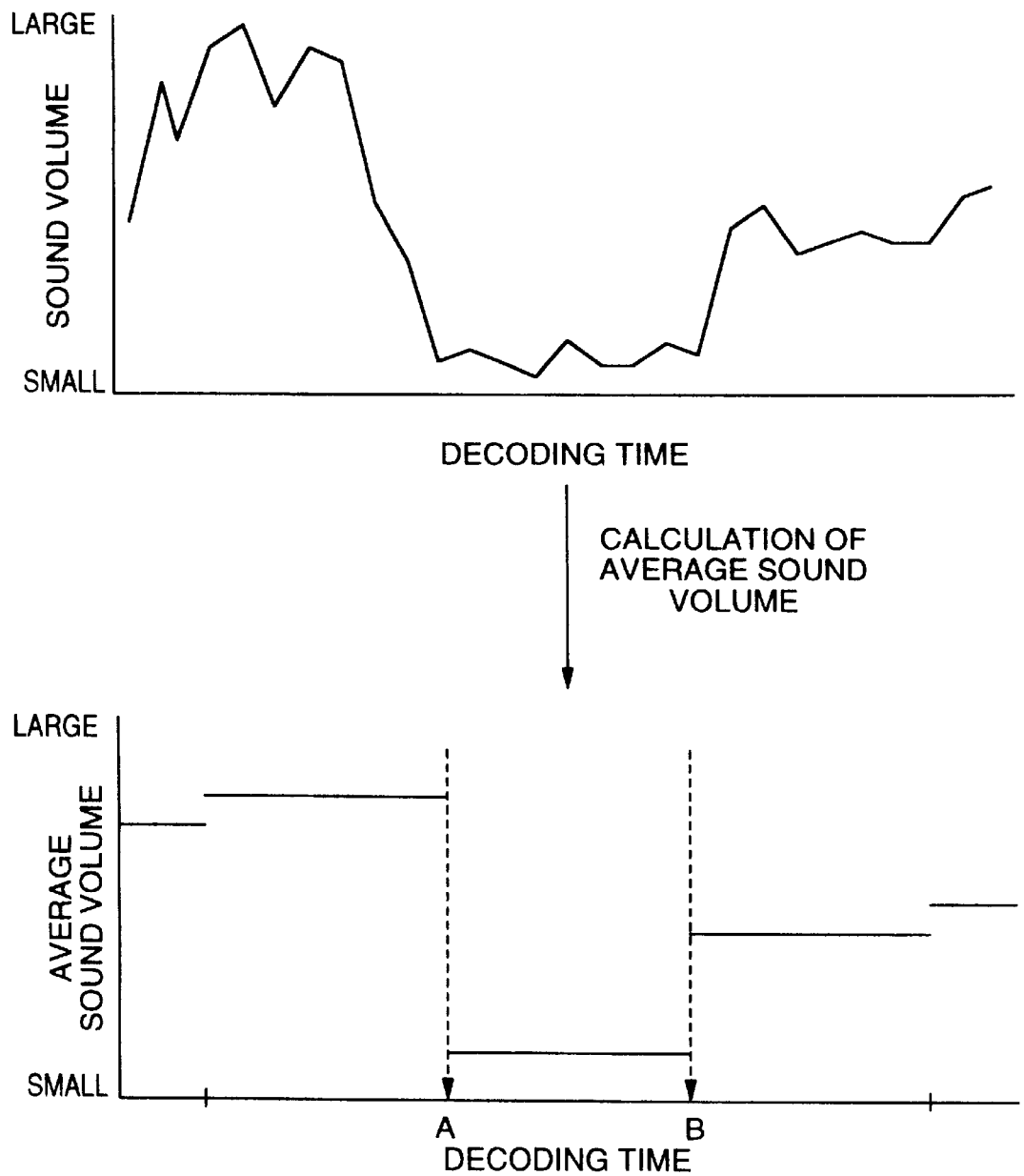
FIG. 19 is a graphic diagram for explaining operation of the mean sound volume calculation in the fourth embodiment of the present invention.
Figure 20:
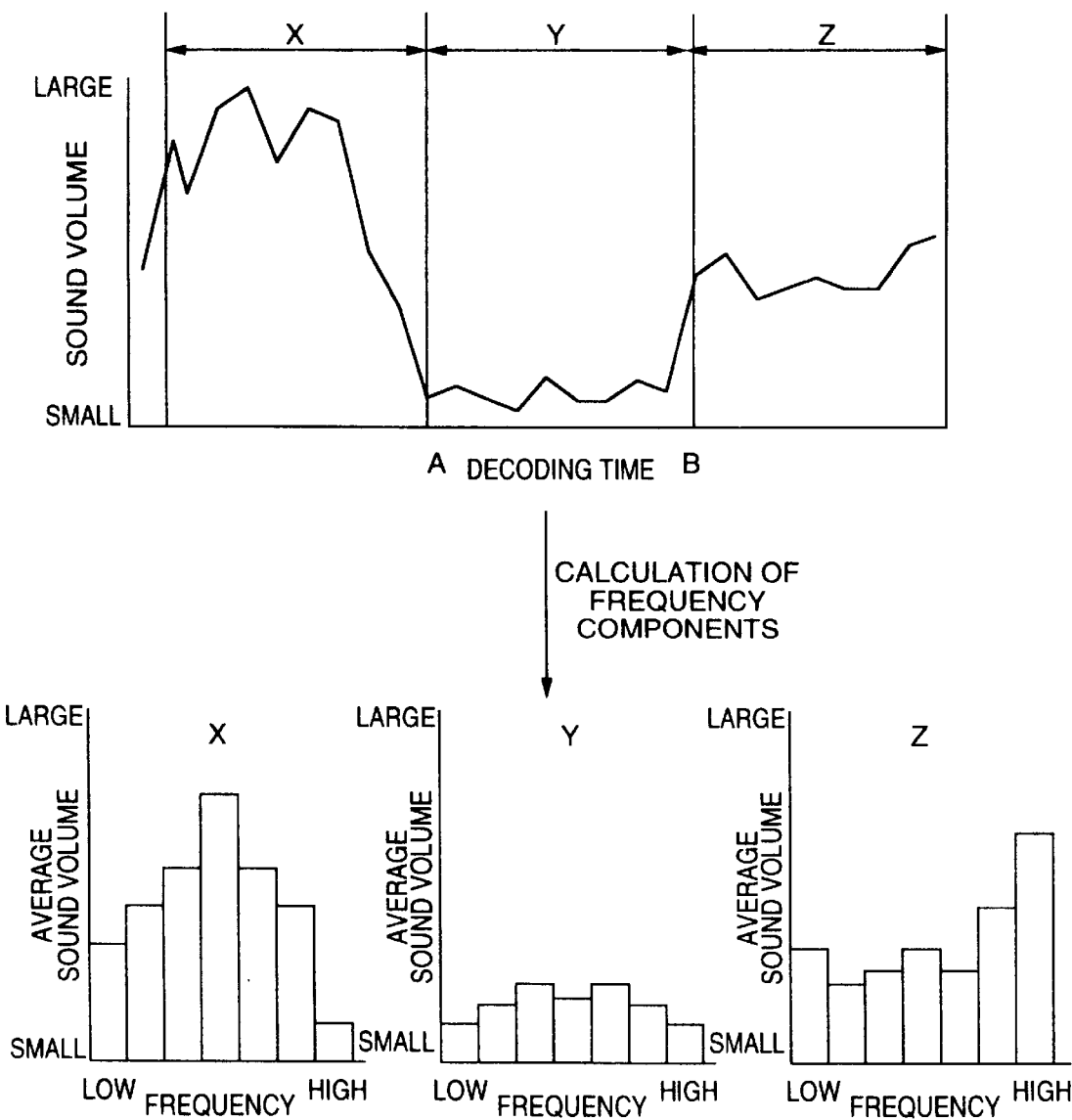
FIG. 20 is a graphic diagram for explaining operation of the frequency component calculation in the fourth embodiment of the present invention.

FIG. 18 shows in a flowchart the processing procedure of the scene change detection, FIG. 19 is a schematic diagram showing operation of the mean sound volume calculation, and FIG. 20 shows in a schematic diagram the operation of the frequency component calculation.

First, the audio data is decoded to obtain pulse code modulation (PCM) data to accumulate the PCM data in the hard drive 503 (step 1801).

Subsequently, the PCM data attained in step 1801 is classified according to decoding time zones to thereby calculate features for the respective zones (step 1802).

The feature may be, for example, a mean sound volume of each decoding time zone (FIG. 19) or a frequency component of each decoding time zone (FIG. 20).

The scene change is then detected according to the features acquired in step 1802 (step 1803).

Next, the scene change detection processing of step 1803 will be described by referring to FIGS. 19 and 20.

In FIG. 19, the mean sound volume considerably varies between points of time A and B. Consequently, it is determined that a scene change takes place at points of time A and B. In FIG. 20, the graphical feature of the frequency components considerably varies between decoding time zones X, Y and Z. Consequently, it is determined that a scene change occurs at the points of time A and B. That is, the occurrence of scene change in the video data with audio data is determined when the difference between the features of consecutive decoding time zones exceeds a predetermined threshold value.

Returning to FIG. 17, description will be given of the operation.

When the scene change is detected in step 1702, step 1704 is executed; otherwise step 1705 is executed. Next, the recording of scene change information in step 1704 will be described by referring to FIG. 21.

Figures 21, 22:
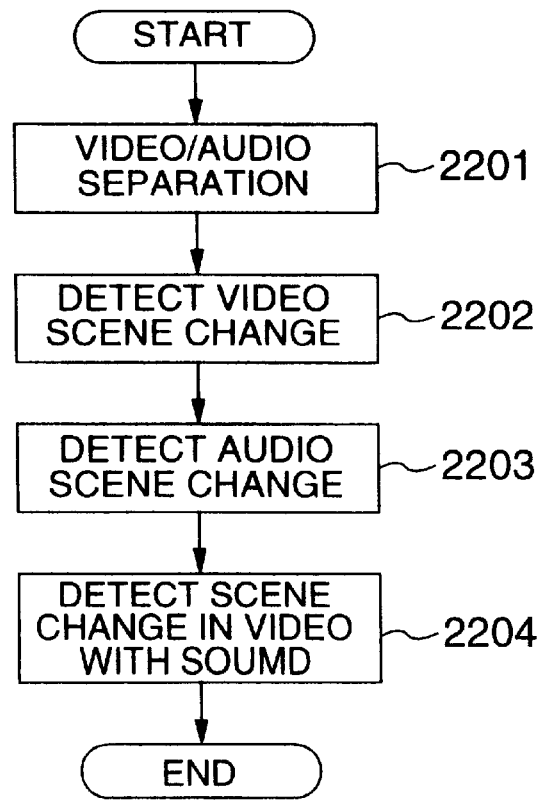
FIG. 21 is a diagram showing an example of the layout of video scene change information in the fourth embodiment of the present invention.
FIG. 22 is a flowchart showing the processing flow of the video scene change detection in the fifth embodiment of the present invention.

FIG. 21 shows the layout of the scene change information table.

The table includes at least a first address of audio data related to a scene change and a decoding time of the scene change.

In the recording of scene change information in step 1704, the scene change information table of FIG. 21 is generated to be accumulated in the main memory 5102.

Returning again to FIG. 17, description will be further given of the operation.

In end detection step 1705, when the end of audio data is detected, step 1702 is executed; otherwise, step 1702 is executed.

Subsequently, description will be given of the fifth embodiment according to the present invention.

The configuration of the device for detecting video data scene change of the fifth embodiment is similar to that of the video data scene change detecting device of the fourth embodiment.

In the embodiment, the detecting device accomplishes a video scene change detection processing in which the device detects a scene change contained in the video data with audio data stored in the DVD drive 5103, produces information associated with the scene change of video data with audio data, and then stores the scene change information in the main memory 5102.

This embodiment is an example in which the video scene change detection processing to be achieved by the video scene change detecting device is realized by software.

Namely, the detection processing is accomplished such that the CPU 5101 loads a software program stored in the ROM 5108 onto the main memory 5102 and then executes the software program on the memory 5102.

Next, the video scene change detection processing of the fifth embodiment of the present invention will be described by referring to drawings.

FIG. 22 is a flowchart for explaining the processing procedure of the detection.

First, video data with audio data is inputted from the DVD drive 5103 such that video data and audio data are separated from the video data with audio data (step 2201).

Thereafter, the scene change detection is carried out in the video scene change detection processing described for the first, second, or third embodiment (step 2202).

Subsequently, in the processing described for the fourth embodiment, the audio scene change detection processing is accomplished to conduct the scene change detection (step 2203).

Next, referring to drawing, description will be given of the scene change point detection of step 2204.

FIG. 23 shows an example of the layout of the scene change information table.

The table includes at least a first address of video or audio data related to a scene change and a decoding time of the scene change.

In step 2204, the scene change point is determined according to the video scene change information attained in step 2202 and the audio scene change information attained in step 2203.

In this situation, it is possible that the scene change point is set to the point of time when the scene change occurs in the video, the point of time when the scene change occurs in the audio, the point of time when the scene change occurs in both of the video and audio, or the point of time when the scene change occurs in the video or audio.

According to the aspect of the present invention described above, video data and audio data are separated from the video data with audio data, the scene change detection is conducted each of the video data and audio data to obtain the scene change information for each thereof, and the scene change point is resultantly detected according to two scene change information items, thereby correctly enabling the scene change with a low processing load.

Consequently, according to either one of the first to fifth embodiments described above, for the video data or video data with audio data, it is possible to appropriately detect the scene change with a reduced processing load. The scene change information thus detected can be used for such operations as the editing and search of video data.

The video data or video data with audio data inputted to the scene change detecting device of each of the embodiments above may be either one of the video data read by the read only storage device, the video data stored in the hard drive, and the video data outputted from the video CODEC, namely, the data is not limited to that described in each of the embodiments.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A method of detecting a scene change in decoding of compressed video data, comprising the steps of:

detecting an I-picture produced by coding video data without using a correlation with respect to another frame contained in the compressed video data;

sequentially generating one frame of image data by decoding data of the detected I-picture to thereby produce respective image data of a plurality of frames;

calculating a difference between a first image data of a first frame in said plurality of frames and a second image data of a second frame decoded from data of the detected I-picture, the second frame being preceding to and most adjacent to the first frame among frames decoded from data of the detected I-picture; and determining occurrence of a scene change in the compressed video data in response to an event in which the calculated difference between the image data items exceeds a predetermined threshold value.

2. A method of detecting a scene change in decoding of compressed video data according to claim 1, comprising:

detecting an I-picture produced by coding compressed video data without using a correlation with respect to another frame contained in the data;

sequentially generating one frame of image data by decoding data of the detected I-picture to thereby produce respective image data of a plurality of frames;

calculating a difference between a first image data of a particular first frame in said plurality of frames and a second image data of a second frame of the I-picture which is preceding to and most adjacent to the particular first frame in respect of I-picture from said generating step;

determining occurrence of a scene change in the video data in response to an event in which the calculated difference between the image data items exceeds a predetermined threshold value; and memorizing a point of time of the occurrence of the scene change in the video data by establishing a correspondence between a first address of the frame at the point of time and a decoding time thereof.

3. A method of detecting a scene change in decoding of compressed video data according to claim 1, comprising:

detecting an I-picture produced by coding compressed video data without using a correlation with respect to another frame contained in the data;

sequentially generating one frame of image data by decoding data of the detected I-picture to thereby produce respective image data of a plurality of frames;

calculating a difference between a first image data of a particular first frame in said plurality of frames and a second image data of a second frame of the I-picture which is preceding to and most adjacent to the particular first frame in respect of I-picture from said generating step;

determining occurrence of a scene change in the video data in response to an event in which the calculated difference between the image data items exceeds a predetermined threshold value;

sequentially generating a direct current component of each of the frames by decoding the data of the detected I-picture to thereby produce respective DC components of a plurality of frames;

calculating a difference between a first DC component of a particular first frame and a second DC component of a second frame adjacent to the particular first frame from said generating step; and determining occurrence of a scene change in the video data when the calculated difference between the DC components exceeds a predetermined threshold value.

4. A method of detecting a scene change in decoding of compressed video data, comprising the steps of:

detecting a picture header contained in compressed video data, the header including a picture type indicating that a current frame is a P-picture created by coding the data using a correlation with respect to one preceding frame and information indicating a start point of data corresponding to one frame of data; and calculating, when the detected picture type of the current frame is the P-picture, a difference between an amount of data of the P-picture of a current frame and an amount of data of a P-picture of a preceding frame most adjacent to the current frame in respect of P-picture; and determining occurrence of a scene change in the compressed video data when the calculated difference between the amounts of data exceeds a predetermined threshold value.

5. A method of detecting a scene change in decoding of compressed video data according to claim 4, further comprising the step of storing a point of time of the occurrence of the scene change in the video data by establishing a correspondence between a first address of the frame at the point of time and a decoding time thereof.

6. A method of detecting a scene change in decoding of compressed video data according to claim 4, wherein a mean value of amounts of data of three frames immediately preceding the current frame is employed as the amount of data of the P-picture of the adjacent preceding frame.

7. A method of detecting a scene change in decoding of compressed video data according to claim 6, wherein the predetermined threshold value is such that when the amount of data of the current frame exceeds twice the mean value of amounts of P-pictures three frames immediately preceding the current frame, thereby determining the occurrence of a scene change in the video data.

8. A method according to claim 4, wherein said calculating step performs calculating and holding of an amount of data of said current frame based on an address of said detected picture header.

9. A method according to claim 4, wherein said predetermined threshold value is determined by multiplying the data amount of the P-picture frame by a predetermined value.

10. A method of detecting a scene change in decoding of compressed video data, comprising the steps of:

detecting a picture header contained in compressed video data, the header including a picture type indicating that a current frame is an I-picture produced by coding the data without using a correlation with respect to another frame or a P-picture created by coding the data using a correlation with respect to one preceding frame and information indicating a relationship of data corresponding to one frame of image data;

determining a picture type of the current frame in accordance with the picture type contained in the detected picture header;

sequentially decoding, when the determined picture type is the I-picture, one frame of data succeeding the detected picture header to thereby produce respective image data of a plurality of frames;

calculating, when the determined picture type is the I-picture, a difference between image data of the I-picture of the current frame and image data of an I-picture of a preceding frame adjacent to the current frame;

determining occurrence of a scene change in the video data when the calculated difference between the image data items exceeds a predetermined threshold value; and determining, when the determined picture type of the current frame is the P-picture on the other hand, occurrence of a scene change in the video data if a difference between an amount of data of the P-picture of the current frame and an amount of data of a P-picture of a preceding frame most adjacent to the current frame in respect of P-picture exceeds a predetermined value.

11. A method of detecting a scene change in decoding of compressed video data according to claim 10, comprising the step of storing a point of time of the occurrence of the scene change in the video data by establishing a correspondence between a first address of the frame at the point of time and a decoding time thereof.

12. A method of detecting a scene change in decoding of compressed video data according to claim 8, further comprising the steps of:

decoding, when the determined picture type of the current frame is the I-picture, data of the I-picture to thereby respectively produce a DC component of each I-picture;

calculating a difference between a DC component of the I-picture of the current frame and a DC component of an I-picture of a preceding frame adjacent to the current frame; and determining occurrence of a scene change in the video data when the calculated difference between the DC components exceeds a predetermined threshold value.

13. A method of detecting a scene change in decoding of compressed video data according to claim 10, wherein when the determined picture type of the current frame is the P-picture, a mean value of amounts of data of three frames immediately preceding the current frame is employed as the amount of data of the P-picture of the preceding frame adjacent to the current frame.

14. A method of detecting a scene change in decoding of compressed video data according to claim 8, wherein when the determined picture type of the current frame is the P-picture, the predetermined threshold value is such that when the amount of data of the current frame exceeds twice the mean value of amounts of data of three frames immediately preceding the current frame, thereby determining the occurrence of a scene change in the video data.

15. A method according to claim 10, wherein said step of determining, when the determined picture type of the current frame is the P-picture, performs calculating step performs calculating and holding of an amount of data of said current frame based on an address of said detected picture header.

16. A method according to claim 10, wherein said predetermined threshold value is determined by multiplying the data amount of the P-picture frame.

17. A method of detecting a scene change in decoding of compressed video data, comprising the steps of:

detecting a picture header contained in compressed video data, the header including a picture type indicating that a current frame is an I-picture produced by coding the data without using a correlation with respect to another frame, a P-picture created by coding the data using a correlation with respect to one preceding frame, or a B-picture generated by coding the data using correlations with respect to two frames including one frame in the past and one frame in the future and information indicating a relationship of data corresponding to one frame of image data;

determining a picture type of the current frame in accordance with the picture type contained in the detected picture header;

sequentially decoding, when the determined picture type is the I-picture, one frame of data succeeding the detected picture header to thereby produce respective image data of a plurality of frames;

calculating a difference between image data of the I-picture of the current frame and image data of an I-picture of a preceding frame adjacent to the current frame;

determining occurrence of a scene change in the video data when the calculated difference between the image data items exceeds a first predetermined threshold value;

determining, when the determined picture type of the current frame is the P-picture, occurrence of a scene change in the video data if a difference between an amount of data of the P-picture of the current frame and an amount of data of the P-picture of a preceding frame most adjacent to the current frame in respect of P-picture exceeds a second predetermined threshold value; and calculating, when the determined picture type of the current frame is the B-picture on the other hand, based on an address of said detected picture header; calculating the current frame and an amount of data of a B-picture of a preceding frame most adjacent to the current frame in respect of B-picture; and determining occurrence of a scene change in the video data if the calculated difference between the amounts of data items exceeds a third predetermined threshold value.

18. A method of detecting a scene change in decoding of compressed video data according to claim 17, further comprising the step of storing a point of time of the occurrence of the scene change in the video data by establishing a correspondence between a first address of the frame at the point of time and a decoding time thereof.

19. A method of detecting a scene change in decoding of compressed video data according to claim 17, wherein a mean value of amounts of data of three frames immediately preceding the current frame is employed as the amount of data of the B-picture of the adjacent preceding frame.

20. A method of detecting a scene change in decoding of compressed video data according to claim 19, wherein the predetermined threshold value is such that when the amount of data of the current frame exceeds four times the mean value of amounts of B-pictures of three frames immediately preceding the current frame, thereby determining the occurrence of a scene change in the video data.

21. A method according to claim 17, calculating step performs calculating and holding of an amount of data of said current frame based on an address of said detected picture header.

22. A method according to claim 17, wherein said second predetermined threshold value is determined by multiplying the data amount of the P-picture frame by a predetermined value and said third predetermined threshold value is determined by multiplying the image data amount of the B-picture by a predetermined value.

23. A method of detecting a scene change in decoding of compressed video data, comprising the steps of:

separating audio data and video data from video data with audio data;

generating pulse code modulation data by decoding the separated audio data;

classifying the generated PCM data according to decoding time zones;

calculating feature for each of the classified decoding time zones; and determining the occurrence of a scene change in the video data with audio data when a difference between the features calculated for the consecutive decoding time zones exceeds a predetermined threshold value.

24. A method of detecting a scene change in decoding of compressed video data according to claim 23, wherein the feature is a mean sound volume of each of the decoding time zones.

25. A method of detecting a scene change in decoding of compressed video data according to claim 23, wherein the feature is a frequency component of each of the decoding time zones.

26. A method of detecting a scene change in decoding of compressed video data with audio data, comprising the steps of:

separating audio data and compressed video data from the video data with audio data;

generating pulse code modulation data by decoding the separated audio data;

classifying the generated PCM data in accordance with decoding time zones; calculating feature for each of the classified decoding time zones; determining the occurrence of a scene change in the video data with audio data when a difference between the features calculated for the consecutive decoding time zones exceeds a predetermined threshold value;

detecting an I-picture produced by coding the separated, compressed video data without using a correlation with respect to another frame contained in the data;

sequentially generating one frame of image data by decoding data of the detected I-picture to thereby produce respective image data of a plurality of frames;

calculating a difference between a first image data of a particular first frame and a second image data of a second frame adjacent to the particular first frame from said generating step; and determining occurrence of a scene change in the video data when the calculated difference between the image data items exceeds a predetermined threshold value.

27. An apparatus for detecting a scene change of video data, comprising:

input means for inputting compressed video data to be decoded;

means for detecting a picture header contained in compressed video data, the header including a picture type indicating that a current frame is an I-picture produced by coding the data without using a correlation with respect to another frame, a P-picture created by coding the data using a correlation with respect to one preceding frame, or a B-picture generated by coding the data using correlations with respect to two frames including one frame in the past and one frame in the future and information indicating a relationship of data corresponding to one frame of image data;

picture type determining means for determining a picture type of the current frame according to the picture type contained in the detected picture header;

image data generating means for sequentially decoding, in response to a determination result from the picture determining means indicating an event that the picture type is the I-picture, one frame of data succeeding the detected picture header to thereby produce respective image data of a plurality of frames;

first determination means for calculating, in response to a determination result from the picture type determined means indicating an event that the picture type of the current frame is the I-picture, a difference between image data the I-picture of the current frame and image data of an I-picture of a preceding frame adjacent to the current frame and determining occurrence of a scene change in the video data when the calculated difference between the data volumes exceeds a first predetermined threshold value;

second determining means for calculating, in response to a determination result from the picture type determining means indicating an event that the picture type of the current frame is the P-picture, a difference between an amount of data of the P-picture of the current frame and that of a P-picture of a preceding frame most adjacent to the current frame in respect of P-picture and determining occurrence of a scene change in the video data if the difference exceeds a second predetermined threshold value; and third determining means for calculating, in response to a determination result from the picture type determining means indicating an event that the picture type of the current frame is the B-picture, a difference between an amount of data of the B-picture of the current frame and that of a B-picture of a preceding frame most adjacent to the current frame in respect of B-picture, and determining occurrence of a scene change in the video data if the difference exceeds a third predetermined threshold value, hold value.

28. An apparatus for detecting a scene change of video data according to claim 27, further comprising recording means connected to outputs respectively of the first, second, and third determining means for recording therein information representing scene changes.

29. An apparatus for detecting a scene change of video data according to claim 27, wherein the first, second, and third determining means include a unit for detecting a scene change between an intra-coded frame contained in the video data and an intra-coded frame preceding the frame.

30. A computer-readable recording medium for storing therein a program to be executed by a computer for a detecting operation to detect a scene change in video data is stored, the media being accessed by the computer for acquisition of data stored therein, wherein the program includes:

input program means for inputting compressed video data to be decoded;

detection program means for detecting a picture header contained in compressed video data, the header including a picture type indicating that a current frame is an I-picture produced by coding the data without using a correlation with respect to another frame, a P-picture created by coding the data using a correlation with respect to one preceding frame, or a B-picture generated by coding the data using correlations with respect to two frames including one frame in the past and one frame in the future and information indicating a relationship of data corresponding to one frame of image data;

picture type determining program means for determining a picture type of the current frame in accordance with the picture type contained in the detected picture header;

image data generating program means for sequentially decoding, in response to a determination result from said picture type determining program means indicating an event that the picture type is the I-picture, one frame of data succeeding the detected picture header to thereby produce respective image data of a plurality of frames;

first determining program means for calculating, in response to a determination result from the picture type determining program means indicating an event that the picture type of the current frame is the I-picture, a difference between image data of the I-picture of the current frame and that of an I-picture of a preceding frame adjacent to the current frame and determining occurrence of a scene change in the video data when the calculated difference between the data items exceeds a first predetermined threshold value;

second determining program means for calculating, in response to a determination result from the picture type determining program means indicating an event that the picture type of the current frame is the P-picture, a difference between an amount of data of the P-picture of the current frame and that of a P-picture of a preceding frame most adjacent to the current frame in respect of P-picture and determining occurrence of a scene change in the video data if the difference exceeds second a predetermined threshold value; and third determining program means for calculating, in response to a determination result from the determining means indicating an event that the picture type of the current frame is the B-picture, a difference between an amount of data of the B-picture of the current frame and an amount of data of a s-picture of a preceding frame most adjacent to the current frame in respect of B-picture and determining occurrence of a scene change in the video data if the difference exceeds a third predetermined threshold value.

31. A recording medium according to claim 30, wherein the program includes recording program means for recording as scene information a result of execution by each of the first, second, and third determining program means.

32. A method of detecting a scene change in decoding of compressed video data, comprising the steps of:

detecting an I-picture produced by coding compressed video data without using a correlation with respect to another frame contained in the data;

sequentially generating one frame of image data by decoding data of the detected I-picture to thereby produce respective image data of a plurality of frames;

calculating a difference between a first image data of a particular first I-picture frame in said plurality of frames and a second image data of a second I-picture frame which is preceding to and most adjacent to the particular first I-picture frame from said generating step; and determining occurrence of a scene change in the video data in response to an event in which the calculated difference between the image data items exceeds a predetermined threshold value.

33. A method of detecting a scene change in decoding of compressed video data, comprising the steps of:

detecting a picture header contained in compressed video data, the header including a picture type indicating that a current frame is a P-picture created by coding the data using a correlation with respect to one preceding frame and information indicating a start point of data corresponding to one frame of image data;

sequentially decoding one frame of data succeeding the detected picture header to thereby produce respective image data of a plurality of frames; and calculating, when the detected picture type of the current frame is the P-picture, a difference between an amount of data of a current P-picture frame and an amount of data of a preceding P-picture frame most adjacent to the current P-picture frame; and determining occurrence of a scene change in the compressed video data when the calculated difference between the amounts of data exceeds a predetermined threshold value.

34. A method of detecting a scene change in decoding of compressed video data, comprising the steps of:

detecting a picture header contained in compressed video data, the header including a picture type indicating that a current frame is a B-picture created by coding the data using a correlation with respect to two frames including one frame in the last and one frame in the future and information indicating a relationship of data corresponding to one frame of data; and calculating, when the detected picture type of the current frame is the B-picture, a difference between an amount of data of a current B-picture frame and an amount of data of a preceding B-picture frame most adjacent to the current B-picture frame; and determining occurrence of a scene change in the compressed video data when the calculated difference between the amounts of data exceeds a predetermined threshold value.

\* \* \* \* \*